United States Patent
Nakai et al.

(10) Patent No.: US 11,719,615 B2
(45) Date of Patent: Aug. 8, 2023

(54) PARTICLE DETECTION DEVICE

(71) Applicant: Mitsubishi Electric Corporation, Tokyo (JP)

(72) Inventors: Kenya Nakai, Tokyo (JP); Nozomi Enoki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 221 days.

(21) Appl. No.: 16/973,432

(22) PCT Filed: Jun. 22, 2018

(86) PCT No.: PCT/JP2018/023741
§ 371 (c)(1),
(2) Date: Dec. 9, 2020

(87) PCT Pub. No.: WO2019/244325
PCT Pub. Date: Dec. 26, 2019

(65) Prior Publication Data
US 2021/0255086 A1     Aug. 19, 2021

(51) Int. Cl.
*G01N 15/14*     (2006.01)
*G01N 15/10*     (2006.01)
(Continued)

(52) U.S. Cl.
CPC ....... *G01N 15/1429* (2013.01); *G01M 11/005* (2013.01); *G01N 15/1012* (2013.01);
(Continued)

(58) Field of Classification Search
None
See application file for complete search history.

(56) References Cited

U.S. PATENT DOCUMENTS

2008/0021674 A1* 1/2008 Puskas ............... G01N 21/6428
702/179
2010/0045982 A1 2/2010 Tsuneta et al.
(Continued)

FOREIGN PATENT DOCUMENTS

CN     101978423 A    2/2011
JP     2010-169612 A  8/2010
(Continued)

OTHER PUBLICATIONS

International Search Report and Written Opinion dated Aug. 7, 2018, received for PCT Application No. PCT/JP2018/023741 Filed on Jun. 22, 2018, 9 Pages including English Translation.
(Continued)

*Primary Examiner* — Rufus L Phillips
(74) *Attorney, Agent, or Firm* — Xsensus LLP

(57) ABSTRACT

A particle detection device includes: a first light source to emit first irradiation light; a first light-collection member; a second light-collection member facing the first reflection surface; a second light source to emit second irradiation light; and a first light-reception element. When the first light source emits the first irradiation light, the first light-reception element detects, as the first incident light, scattered light generated when a particle existing at a detection position in a target space is irradiated with the first irradiation light. When the second light source emits the second irradiation light, the first light-reception element detects, as the first incident light, a light ray of the second irradiation light that is reflected by the first reflection surface and a light ray of the second irradiation light that is reflected by both the first reflection surface and the second reflection surface.

17 Claims, 13 Drawing Sheets

(51) Int. Cl.
_G01M 11/00_ (2006.01)
_G01N 21/94_ (2006.01)

(52) U.S. Cl.
CPC ......... _G01N 15/1434_ (2013.01); _G01N 21/94_ (2013.01); _G01N 2015/145_ (2013.01); _G01N 2015/1438_ (2013.01)

(56) References Cited

U.S. PATENT DOCUMENTS

| | | | | |
|---|---|---|---|---|
| 2013/0316395 | A1* | 11/2013 | Kinugasa | G01N 21/64 356/337 |
| 2013/0335739 | A1* | 12/2013 | Stengel | G01N 21/53 356/338 |
| 2019/0033224 | A1* | 1/2019 | Niemann | G01N 15/0211 |
| 2019/0285537 | A1* | 9/2019 | Spruit | G01N 15/1434 |
| 2020/0256782 | A1* | 8/2020 | Hairston | G01N 15/1459 |

FOREIGN PATENT DOCUMENTS

| | | |
|---|---|---|
| JP | 2016-212060 A | 12/2016 |
| WO | 2007/063862 A1 | 6/2007 |

OTHER PUBLICATIONS

Office Action dated Mar. 8, 2023 in Chinese Patent Application No. 201880094629.3 (with English translation), 20 pages.

* cited by examiner

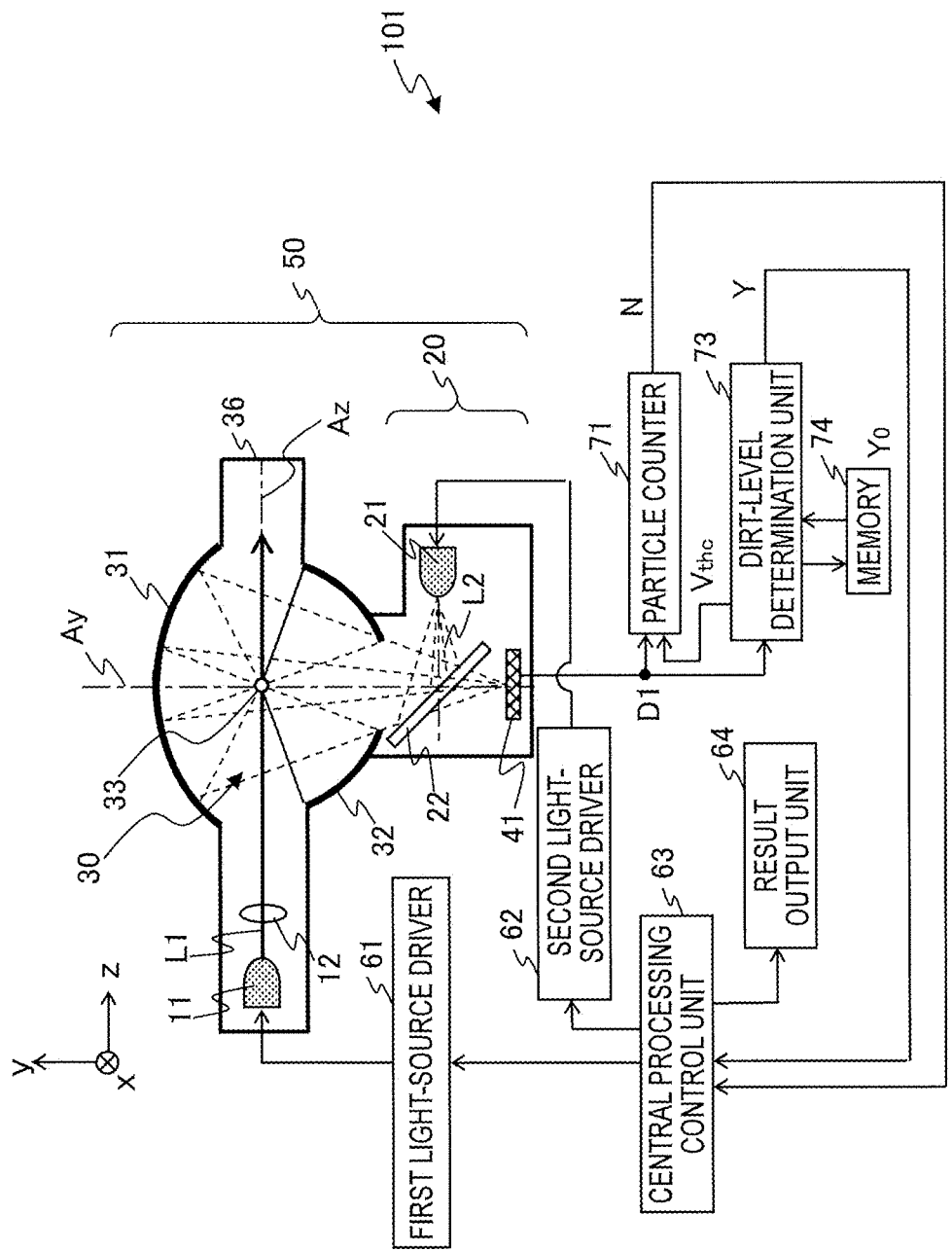

PARTICLE DETECTION DEVICE

CROSS-REFERENCE TO RELATED APPLICATION

The present application is based on PCT filing PCT/JP2018/023741, filed Jun. 22, 2018, the entire contents of which are incorporated herein by reference.

TECHNICAL FIELD

The present invention relates to a particle detection device for detecting floating particles.

BACKGROUND ART

Various particle detection devices (also referred to as 'particle sensors') have been proposed: such particle detection devices detect scattered light generated at particles when a space in which the particles as floating micro substances such as pollen or dust exist is irradiated with light, thereby determining the quantity of the particles, sizes of the particles, types of the particles or the like. For example, Patent Document 1 describes a particle sensor in which scattered light generated at a particle when the particle is irradiated with light emitted from a light source is reflected by a light-collection mirror as a light-collection member and then collected scattered light is detected by a light-reception element.

PRIOR ART REFERENCE

Patent Document

Patent Document 1: International Publication No. 2007/063862 (FIG. 13, FIG. 15, paragraphs 0171 to 0173, for example)

SUMMARY OF THE INVENTION

Problem to be Solved by the Invention

However, part of the particles floating in an air taken into the particle sensor is adhered as dirt onto the light-collection mirror and that may cause change in the light-reflection properties of the light-collection mirror. In such a case, there is a problem in that the intensity of the scattered light detected by the light-reception element of the particle sensor changes and thus the particles cannot be accurately detected.

The present invention is made to solve the problem of the conventional art and an object of the present invention is to provide a particle detection device capable of detecting the degree of dirt on the light-collection member.

Means for Solving the Problem

A particle detection device according to an aspect of the present invention is a device for detecting particles floating in a target space. The particle detection device includes: a first light source to emit first irradiation light traveling in the target space; a first light-collection member having a concave-shaped first reflection surface; a second light-collection member having a concave-shaped second reflection surface facing the first reflection surface across the target space; a second light source to emit second irradiation light; and a first light-reception element to output a first detection signal indicating a value corresponding to the intensity of first incident light. When the first light source emits the first irradiation light, the first light-reception element detects, as the first incident light, scattered light generated when a particle existing at a predetermined detection position in the target space is irradiated with the first irradiation light. When the second light source emits the second irradiation light, the first light-reception element detects, as the first incident light, a light ray of the second irradiation light that is reflected at the first reflection surface and a light ray of the second irradiation light that is reflected at both the first reflection surface and the second reflection surface.

Effect of the Invention

According to the present invention, the degree of dirt on the light-collection member of the particle detection device can be detected.

BRIEF DESCRIPTION OF THE DRAWINGS

FIG. 3 is a diagram schematically showing a configuration of an optical system and a configuration of a control system of a particle detection device according to a modification example of the first embodiment.

MODE FOR CARRYING OUT THE INVENTION

Figure 1:
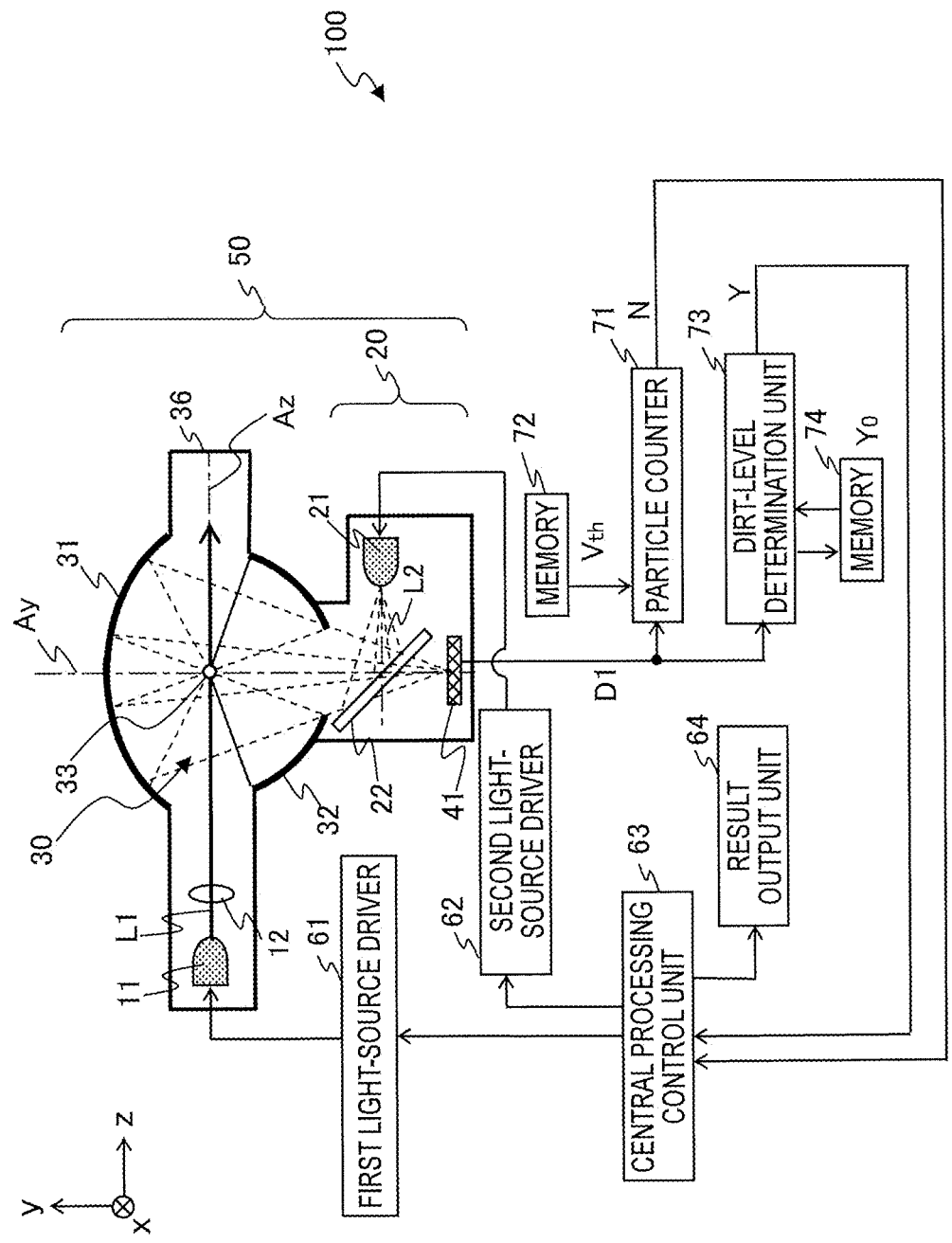
FIG. 1 is a diagram schematically showing a configuration of an optical system and a configuration of a control system of a particle detection device according to a first embodiment of the present invention.

Microscopic-substance detection devices, that is, particle detection devices according to embodiments of the present invention will be described below with reference to the attached drawings. The following embodiments are only examples and various modifications can be made within the scope of the present invention.

In a particle detection device, when particles as micro substances floating in a target space are irradiated with light, scattered light is generated at the particles and detected by a light-reception element as a photodetector. The floating particles are PM2.5, PM10, pollen, dust or the like, for example. In order to increase the light amount of the scattered light that reaches the light-reception element, the scattered light is collected by a light-collection mirror as a light-collection member.

However, part of the floating particles occasionally adheres to a light-reflection region of the light-collection mirror. In such a case, light-reflection properties of the light-collection mirror change (that is, its light-reflection performance decreases) and the light amount of the light that reaches the light-reception element accordingly decreases.

Thus, in the embodiments of the present invention, description will be given of a particle detection device capable of detecting a change in the light-reflection properties of the light-collection mirror and the particle detection device capable of adjusting operation of a control system on the basis of a result of the detection of the change in the light-reflection properties of the light-collection mirror.

In order to facilitate understanding of configurations of optical systems shown in the drawings, coordinate axes of an xyz orthogonal coordinate system are shown in each drawing, if necessary. In each drawing, an x axis is a coordinate axis parallel to a first center axis Ax connecting the center of an air inlet and the center of an air outlet in the particle detection device according to each of the embodiments. The direction from the air inlet toward the air outlet is a +x axis direction and the opposite direction is a −x axis direction. In each drawing, a y axis is a coordinate axis parallel to a second center axis Ay connecting the center position of a first light-collection mirror and the center position of a second light-collection mirror. The direction of a light-reception element is a −y axis direction and the opposite direction is +y axis direction. In each drawing, a z axis is a coordinate axis parallel to a third center axis Az that is parallel to a direction in which first irradiation light emitted from a first light source travels. The direction in which the first irradiation light from the first light source travels is a +z axis direction and the opposite direction is a −z axis direction.

(1) First Embodiment (1-1) Configuration of Particle Detection Device

FIG. 1 is a diagram schematically showing a configuration of an optical system 50 and a configuration of a control system of a particle detection device 100 according to a first embodiment. FIG. 1 shows a structure of the optical system 50 in a cross section obtained by cutting it by a plane parallel to a yz plane. FIG. 1 also shows components of the control system for particle detection and dirt detection, as functional blocks.

The particle detection device 100 according to the first embodiment takes air into a target space 30 inside the device, detects scattered light generated at particles floating in the taken air when the particles are irradiated with first irradiation light L1, and thus determines the number, sizes, types or the like of the particles, on the basis of the result of the detection. Detecting scattered light generated at particles when the particles are irradiated with the first irradiation light L1, the particle detection device 100 can also determine, on the basis of the result of the detection, the number concentration or the mass concentration indicating the density of the particles. The 'number concentration' denotes the number of particles per unit volume. The 'mass concentration' denotes the weight of particles per unit volume.

The particle detection device 100 can also detect dirt on a component of the optical system 50 in the device by using second irradiation light L2. Dirt on a component of the optical system 50 includes change in optical properties of a component of the optical system 50 (e.g., an optical member made of glass, plastic, metal or the like) caused by degradation due to aging.

The optical system 50 of the particle detection device 100 includes: a first light source 11 for emitting first irradiation light L1; a first light-reception element 41 as a photoelectric conversion means for outputting a first detection signal D1 as an electrical signal of a value corresponding to the light amount of incident light; a first light-collection mirror 31 as a first light-collection member having a first reflection surface (also referred to as a 'light-reflection region') for guiding scattered light generated at a particle when the particle is irradiated with the first irradiation light L1 to a light-reception surface of the first light-reception element 41; and a second light-collection mirror 32 as a second light-collection member having a second reflection surface (also referred to as a 'light-reflection region'). The optical system 50 of the particle detection device 100 can include: a lens 12 as an optical member for adjusting a travel direction of the first irradiation light L1 emitted from the first light source 11 (e.g., a divergence angle) and the like; and a beam trap 36 as an optical member for preventing the first irradiation light L1 that has passed through the target space 30 from returning the target space 30.

The first light source 11 is a laser light source for emitting laser light or an LED (Light Emitting Diode) light source for emitting LED light, for example. The first irradiation light L1 may be any of monochromatic light, white light and light having another wavelength.

While air is taken in the target space 30, floating particles exist in the target space 30. The lens 12 guides the first irradiation light L1 emitted from the first light source 11 to a detection position 33 in the target space 30.

The lens 12 changes a divergence angle of the incoming first irradiation light L1. The first irradiation light L1 emitted from the first light source 11 is collected by the lens 12, for example. Alternatively, the first irradiation light L1 emitted from the first light source 11 is converted to collimated light by the lens 12. The lens 12 may be a cylindrical lens or a toroidal lens equipped with a light-collection function, for example. The function of the lens 12 is not limited to such functions. If the intensity of the first irradiation light L1 can be set sufficiently large, the lens 12 can be excluded.

As shown in FIG. 1, the control system of the particle detection device 100 may include: a first-light source driver 61 for driving the first light source 11; and a particle counter (also referred to as a 'first particle counter') 71 for counting values corresponding to the number of the particles floating in the air taken in the target space 30, on the basis of the detection signal D1 outputted from the first light-reception element 41.

The optical system 50 of the particle detection device 100 further includes: a second light source 21; and an optical-path changing member that is a member or a device having a function of changing a path of incident light. The optical-path changing member is a beam splitter 22, for example. The particle detection device 100 guides second irradiation light L2 emitted from the second light source 21, via the beam splitter 22 (in FIG. 1, it is reflected by the beam splitter 22), so as to travel toward the first light-collection mirror 31 and the second light-collection mirror 32. The particle detection device 100 then guides light reflected by the first light-collection mirror 31 and light reflected by the first light-collection mirror 31 and subsequently reflected by the second light-collection mirror 32, via the beam splitter 22 (in FIG. 1, it passes through the beam splitter 22), to reach the light reception surface of the first light-reception element 41. The position of the second light source 21 and the position of the first light-reception element 41 can be replaced with each other. The second light source 21, the beam splitter 22 and the first light-reception element 41 constitute a dirt-detection optical system 20.

The second light source 21 is a laser light source or an LED light source, for example. The second irradiation light L2 emitted from the second light source 21 may be any of monochromatic light, polychromatic light, white light and light having another wavelength.

The beam splitter 22 is an optical-path changing member having a function of dividing incident light into two or more light rays. A part of the incident light is reflected by the beam splitter 22 and another part of the incident light passes through the beam splitter 22. The beam splitter 22 may be a polarizing beam splitter that separates incident light into polarization components. The beam splitter 22 is an optical member used for an optical pickup, a reflection-type liquid-crystal display projector, an optical communication device, a photon random number generator or the like, for example. The beam splitter 22 may be a half mirror that makes the ratio of the intensity of reflected light to the intensity of transmitted light when incident light hits the beam splitter 22 be approximately 1:1. A half mirror has a plate-shaped structure and can include a wide region for transmitting or reflecting incident light.

As shown in FIG. 1, the control system of the particle detection device 100 may include: a second light-source driver 62 for driving the second light source 21; and a dirt-level determination unit (also referred to as a 'first dirt-level determination unit') 73 for determining dirt on the first light-collection mirror 31 and the second light-collection mirror 32, on the basis of the first detection signal D1 outputted from the first light-reception element 41. The control system of the particle detection device 100 may further include a central processing control unit 63 for performing various types of processing, such as controlling the first light-source driver 61, the second light-source driver 62, the particle counter 71 and the dirt-level determination unit 73.

The control system of the particle detection device 100 may further include a result output unit 64 for informing a user of the number of particles, a result of determination of a dirt level value and the like. The particle counter 71, the dirt-level determination unit 73 and the central processing control unit 63 constitute a control section for controlling the entire operation of the particle detection device 100.

Figure 2:
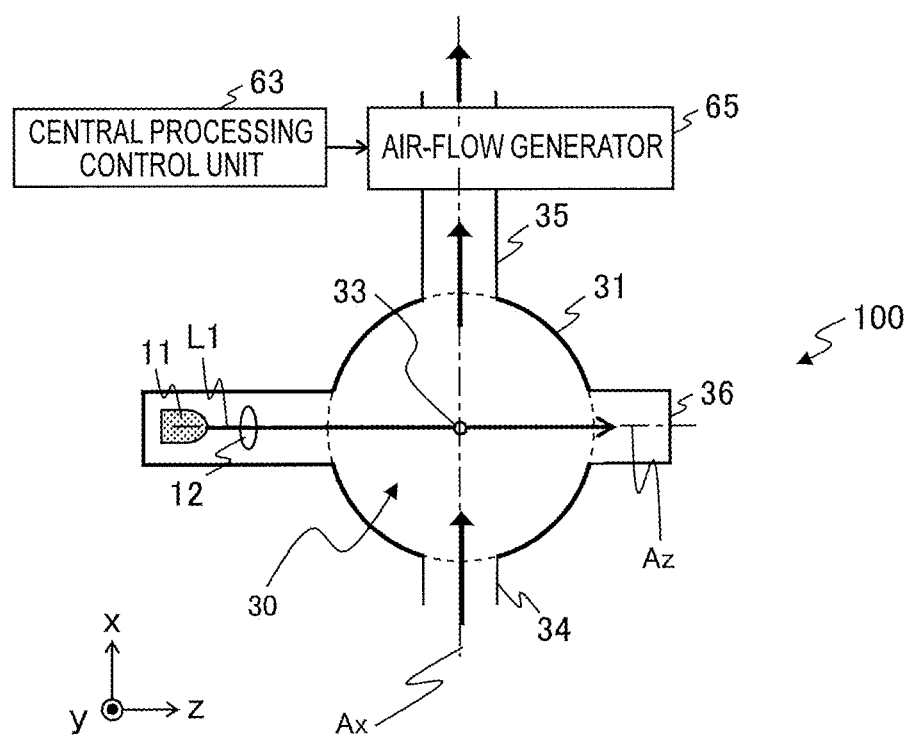
FIG. 2 is a diagram schematically showing a configuration of the optical system and a configuration for taking air in of the particle detection device according to the first embodiment.

FIG. 2 is a diagram schematically showing a configuration of the optical system 50 and a configuration for taking air in of the particle detection device 100. FIG. 2 shows a structure of the optical system 50 and an air flow path in a cross section obtained by cutting them by a plane parallel to a zx plane. FIG. 2 shows components of the control system for taking air in, as functional blocks.

As shown in FIG. 2, the particle detection device 100 can include: an air inlet 34 as an inlet through which air is taken into the target space 30 in the device; an air outlet 35 as an outlet through which the air taken into the target space 30 is discharged; and an air-flow generator 65 such as a fan generating a flow of air from the air inlet 34 to the air outlet 35. The operation of the air-flow generator 65 is controlled by the central processing control unit 63, for example.

FIG. 3 is a diagram schematically showing a configuration of an optical system and a configuration of a control system of a particle detection device 101 according to a modification example of the first embodiment. In FIG. 3, components identical to or corresponding to the components shown in FIG. 1 are assigned reference characters identical to the reference characters shown in FIG. 1. The particle detection device 101 shown in FIG. 3 differs from the particle detection device 100 shown in FIG. 1 in that the particle counter 71 receives a threshold voltage $V_{th}$ from the dirt-level determination unit 73. Except for the difference, the particle detection device 101 shown in FIG. 3 is the same as the particle detection device 100 shown in FIG. 1.

In FIG. 1 and FIG. 3, main optical paths through the first light-collection mirror 31 and the second light-collection mirror 32 are indicated by broken lines. The optical paths will be described later in detail, with reference to FIG. 4 (a) to FIG. 4(c), FIG. 5(a) and FIG. 5(b).

Particles floating in the target space 30 are floating micro particulate matter and also referred to as micro substances. Although, in FIG. 1 and FIG. 3, a single particle existing at a detection position 33 is drawn as a circle like a dot, there are a large number of floating particles in the target space 30. Although, in FIG. 1 and FIG. 3, the single particle is drawn as an enlarged circle, the particles include a particle such that it cannot be visually recognized in size (particle diameter). Particles to be a detection target are floating pollen, floating dust, particles contained in cigarette smoke or the like, for example. Dust is also referred to as house dust. The particles also include dead bodies of micro-animals such as mites, their fragments, droppings of micro-animals or the like that are floating. The particles also include PM2.5, PM10 or the like, so-called micro particulate matter. PM2.5 is floating particles each having a diameter of 2.5 µm or less. Constituents of PM2.5 include inorganic elements such as carbon, nitrate, sulfate, an ammonium salt, silicon, natrium or aluminum, for example. PM10 is particles floating in air and of 10 µm or less in size. The micro particulate matter denotes micrometer-sized microscopic particles in solid or liquid.

As shown in FIG. 1 and FIG. 3, the particle passing through the detection position 33 is irradiated with the first irradiation light L1. At the time, scattered light is generated at the particle. The 'scattered light' denotes light generated when the first irradiation light L1 hits the particle and then its propagation state is changed. 'Propagation' denotes that a wave travels in a medium while spreading. That is, the 'propagation' denotes that light travels in a space. The target space 30 is a space in air, in a liquid, in a vacuum or the like. The 'scattered light' includes fluorescence and Raman-scattered light generated at the particle due to the first irradiation light L1, and the like. There is no special limitation on the particles as the detection target, as long as they are microscopic matter that generate scattered light when irradiated with the first irradiation light L1.

The first light-collection mirror 31 and the second light-collection mirror 32 guide part of scattered light generated at a particle to the light-reception surface of the first light-reception element 41. The first light-collection mirror 31 is an ellipsoidal mirror, for example. Ideally, the second light-collection mirror 32 is a spherical mirror, for example. However, the second light-collection mirror 32 may be an ellipsoidal mirror. The first light-collection mirror 31 and the second light-collection mirror 32 may be a region that is part of a single light-collection mirror. The first light-collection mirror 31 and the second light-collection mirror 32 are light-collection members for collecting light by reflecting light.

Here, the ellipsoidal mirror does not necessarily need to have an ideal ellipsoid-shaped reflection surface (i.e., ellipsoidal surface). An ellipsoidal mirror is a mirror having a function of reflecting light diverged from a certain point to converge the light at another point; it is an ellipsoidal mirror in a broad sense. The another point at which light is converged may be a region having a certain amount of space (i.e., a range of a certain size). When a light ray passing through a first focal point as one of two focal points of an ellipse is reflected by an ellipsoidal surface, the reflected light passes through a second focal point as the other focal point.

The first light-collection mirror 31 reflects directly-incoming scattered light from a particle to guide the light to the light-reflection surface of the first light-reception element 41. For example, the air inlet 34 and the air outlet 35 allow air to pass through the position of a first focal point of the first light-collection mirror 31 to guide the particle to the position of the first focal point. Meanwhile, at the position of a second focal point of the first light-collection mirror 31, the first light-reception element 41 is disposed.

The air inlet 34 is a sucking nozzle, for example. The air outlet 35 is a discharging nozzle, for example. The air inlet 34 guides air or liquid containing particles as the detection target to the target space 30. Through the air outlet 35, the air or the liquid containing the particles as the detection target is discharged from the target space 30. A region through which the particles pass is formed between the air inlet 34 and the air outlet 35.

The first irradiation light L1 is made to hit a particle located at the first focal point. The particle detection device 100 is configured so that a path of the first irradiation light L1 includes the first focal point of the first light-collection mirror 31.

The second light-collection mirror 32 is a spherical mirror, for example. In this case, the second light-collection mirror 32 is disposed so that the center position of a concave-shaped light-reflection region of the second light-collection mirror 32 is near (desirably, coincides with) the first focal point of the first light-collection mirror 31. Accordingly, scattered light generated at the particle located at the detection position 33 that is the position of the first focal point is reflected by the second light-collection mirror 32, then reflected by the first light-collection mirror 31 and guided to the light-reception surface of the first light-reception element 41. The second light-collection mirror 32 is not necessary to be a perfect spherical mirror and its shape is sufficient as long as most of scattered light reflected by the second light-collection mirror 32 is guided to the light-reception surface of the first light-reception element 41 via the first light-collection mirror 31.

In FIG. 1 to FIG. 3, the first irradiation light L1 emitted from the first light source 11 is orthogonal to a line connecting the center position of the air inlet 34 and the center position of the air outlet 35 (a line parallel to the x axis). However, the direction of the first irradiation light L1 is not limited to the direction shown in FIG. 1 to FIG. 3. It means that the first irradiation light L1 emitted from the first light source 11 is not necessary to be parallel to the z axis. As shown in FIG. 2, while air is flowing, a particle floating in the air moves in substantially the +x axis direction following the movement of the air.

The beam trap 36 is a light confiner for preventing the first irradiation light L1 emitted from the first light source 11 that has passed through the target space 30 from being reflected and returning to the target space 30, or a light absorbing member, or a light guide unit for releasing light outside the target space 30 in which the air is taken. The beam trap 36 may be another means, as long as it is a means that prevents the first irradiation light L1 that has passed through the target space 30 from being reflected and returning to the target space 30.

When the first irradiation light L1 is emitted from the first light source 11, the first light-reception element 41 detects scattered light generated at a particle. The first light-reception element 41 is a photodiode, a pyroelectric element, a photon counter using a photomultiplier tube, or the like, for example. The first light-reception element 41 has a light-reception surface for receiving light and outputs, as the first detection signal D1, a current or a voltage of a value corresponding to the intensity of incident light that reaches the light-reception surface (also referred to as 'first incident light'), that is, the light amount of the incident light.

The particle counter 71 detects the number of particles, the weight of particles, types of particles or the like, on the basis of a count value obtained by counting the number of peaks in the waveform of the first detection signal D1 received from the first light-reception element 41. For example, the particle counter 71 detects increase or decrease in the intensity of scattered light generated at each of a plurality of particles passing through the detection position, thereby determining the number of particles, the weight of particles, types of particles or the like.

In a case that the first detection signal D1 outputted from the first light-reception element 41 is a current signal, the particle counter 71 can determine the number of particles, the weight of particles, types of particles or the like, on the basis of a signal waveform outputted from a current/voltage conversion circuit (i.e., an IV conversion circuit) for converting a current value of a current signal outputted from the first light-reception element 41 to a voltage or a signal waveform corresponding to the intensity of scattered light generated at each of the plurality of particles passing through the detection position.

In a case that the first detection signal D1 outputted from the first light-reception element 41 is a voltage signal, the particle counter 71 may include a buffer circuit for receiving a voltage value outputted from the first light-reception element 41, in order to convert it to a stable voltage. The buffer circuit is a voltage follower, for example.

The particle counter 71 may include a gain circuit for amplifying the first detection signal D1 to be a signal of an appropriate level, in order to count the particles. The particle detection device 100 may have a memory 72 as a storage unit for storing a threshold voltage used in the particle counter 71. The particle counter 71 counts the particles in the following manner, for example.

The particle counter 71 sets a threshold voltage $V_{th}$ for counting particles, with respect to a pulse-like or spike-like electrical output waveform (e.g., voltage waveform) that is the first detection signal D1 outputted from the first light-reception element 41 according to the light amount (i.e., optical power) of scattered light generated at each particle passing through the detection position 33, and the particle counter 71 counts the number of waveforms exceeding the threshold voltage $V_{th}$ and outputs a count value N. The count value N is a value corresponding to the number of detected particles.

Further, the particle counter 71 can set, as the threshold voltage $V_{th}$, a plurality of different threshold voltages $V_{th\_1}$, $V_{th\_2}$, ..., $V_{th\_k}$. k is an integer of two or greater. In this case, by comparing a voltage waveform that is the first detection signal D1 with these threshold voltages $V_{th\_1}$, $V_{th\_2}$, ..., $V_{th\_k}$, the size or the weight of each particle passing through the detection position 33 can be determined.

The particle counter 71 can use the threshold voltage $V_{th}$ for counting particles by acquiring it from the threshold voltage held in the memory 72 in advance.

In a case where the light amount of scattered light is small, reducing the threshold voltage $V_{th}$ to an appropriate voltage value makes it possible to reduce decrease in the particle count value due to that the light amount of the scattered light is small.

(1-2) Particle Detection

Figure 4A:
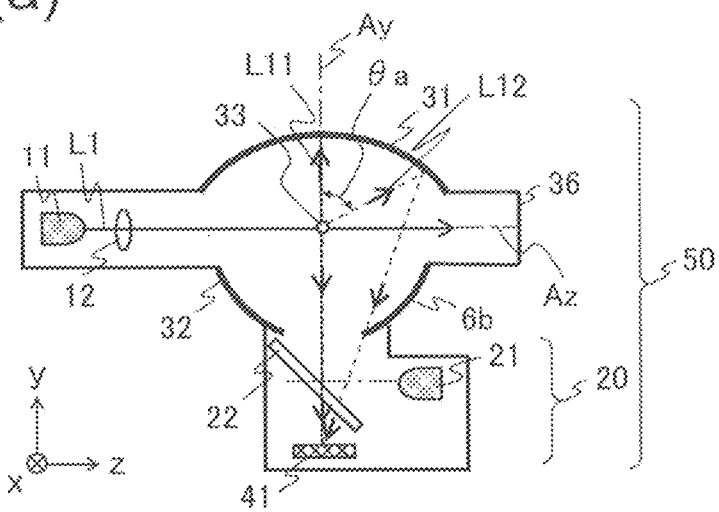
FIG. 4(a) to FIG. 4(c) are diagrams schematically showing paths of first irradiation light and paths of scattered light when the particle detection device according to the first embodiment performs particle detection.
Figure 4B:
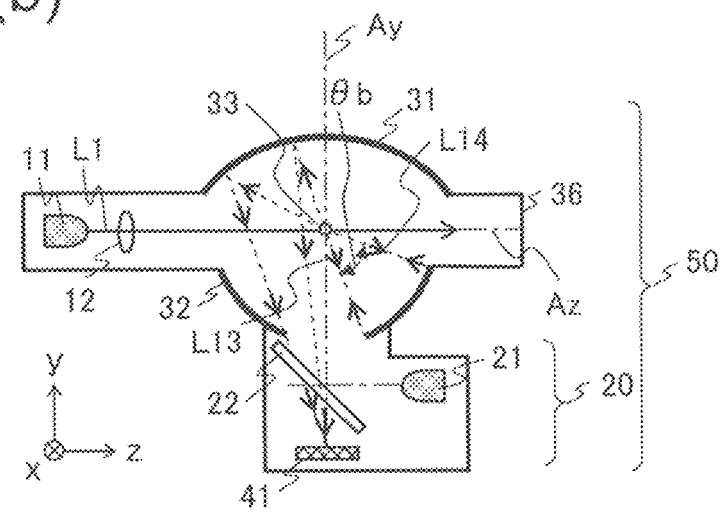
Figure 4C:
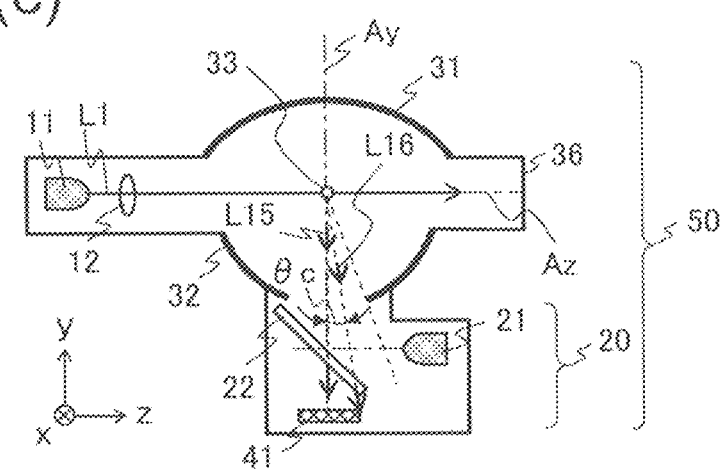

Next, the following gives a description of a relationship between scattered light when the first light source 11 emits the first irradiation light L1 and the first detection signal D1 outputted from the first light-reception element 41 in the particle detection device 100. FIG. 4(a) through FIG. 4(c) are diagrams schematically showing paths of the first irradiation light L1 and paths of scattered light when the particle detection device 100 performs particle detection. FIG. 4(a) through FIG. 4(c) show representative light rays of scattered light.

FIG. 4(a) through FIG. 4(c) show a structure of the optical system 50 in a cross section obtained by cutting it by a plane parallel to a yz plane. However, a light-reflection region of the first light-collection mirror 31 and a light-reflection region of the second light-collection mirror 32 are provided in 360-degree directions around the axis line Ay parallel to the y axis. Hence, the description with reference to FIG. 4(a) through FIG. 4(c) applies to every surface in 360-degree directions around the axis line Ay.

FIG. 4(a) shows light rays of scattered light generated when a particle at the detection position 33 is irradiated with the first irradiation light L1; the light rays travel along an optical path allowing light to be reflected by the first light-collection mirror 31, then pass through the beam splitter 22 and then reach the light-reception surface of the first light-reception element 41 (e.g., light rays L11, L12 traveling along a first path in FIG. 4(a)). This optical path is referred to as the first path. Scattered light rays represented by the first path constitute a group of light rays existing in a range of an angle θa formed between the light rays L11 and L12 traveling along the first path. Part of the scattered light that has reached the beam splitter 22 is reflected by the beam splitter 22 and then travels toward the position of the second light source 21 or its vicinity.

FIG. 4(b) shows light rays of the scattered light generated when the particle at the detection position 33 is irradiated with the first irradiation light L1; the light rays are reflected by the second light-collection mirror 32, are then reflected by the first light-collection mirror 31, then pass through the beam splitter 22, and then reach the light-reception surface of the first light-reception element 41 (e.g., light rays L13, L14 traveling along a second path in FIG. 4(b)). The optical path is referred to as the second path. Scattered light rays represented by the second path constitute a group of light rays existing in a range of an angle θb formed between the light rays L13 and L14 traveling along the second path. Part of the scattered light that has reached the beam splitter 22 is reflected and then travels toward the position of the second light source 21 or its vicinity.

FIG. 4(c) shows light rays of the scattered light generated when the particle at the detection position 33 is irradiated with the first irradiation light L1; the light rays are reflected by neither the first light-collection mirror 31 nor the second light-collection mirror 32, directly reach the beam splitter 22, then pass through the beam splitter 22, and then reach the light-reception surface of the first light-reception element 41 (e.g., light rays L15, L16 traveling along a third path in FIG. 4(c)). The optical path is referred to as the third path. Scattered light rays represented by the third path constitute a group of light rays existing in a range of an angle θc formed between the third light rays L15 and L16. Part of the scattered light that has reached the beam splitter 22 is reflected and then travels toward the position of the second light source 21 or its vicinity.

Guiding the scattered light to the light-reception surface of the first light-reception element 41 along the first path, the second path and the third path as described above improves the scattered-light detection efficiency. Further, the improvement of the scattered-light detection efficiency can improve accuracy of detecting the particle number concentration or the particle mass concentration.

(1-3) Dirt Detection

Next, the following gives a description of the dirt-detection optical system 20 that is an optical system for detecting the degree of dirt adhered to the light-reflection region of the first light-collection mirror 31 and the light-reflection region of the second light-collection mirror 32. Detecting the degree of dirt is also referred to as 'dirt detection'. A value indicating the degree of dirt is referred to as a 'dirt level value'.

The particle detection device 100 detects the degree of dirt adhered to the light-reflection region of the first light-collection mirror 31 and the light-reflection region of the second light-collection mirror 32. In order to detect the degree of the dirt, the light-reflection region of the first light-collection mirror 31 and the light-reflection region of the second light-collection mirror 32 are irradiated with the second irradiation light L2 by the second light source 21 and reflection light is monitored. The particle detection device 100 can also detect an effect when deterioration of light reflection properties of the first light-collection mirror 31 and the second light-collection mirror 32 is caused by change due to aging or the like. The term 'dirt' in the present application covers change in light reflection properties of an optical member caused by change due to aging.

The dirt-detection optical system 20 may have another light-reception element in addition to the first light-reception element 41. However, using the first light-reception element 41 for both particle detection and dirt detection makes it possible to reduce the number of parts of the optical system 50 and therefore to reduce the size and the weight of the particle detection device 100.

The second irradiation light L2 emitted from the second light source 21 is reflected by the beam splitter 22 and then reaches the first light-collection mirror 31.

The second irradiation light L2 that reaches the first light-collection mirror 31 is diverging light. The second light source 21 is disposed so that the second irradiation light L2 reflected by the first light-collection mirror 31 is collected on the light-reception surface of the first light-reception element 41. In other words, the second light source 21 is disposed at a position to be optically conjugate to the second focal point of the first light-collection mirror 31. In this case, the second irradiation light L2 is reflected by the second light-collection mirror 32, reaches the first light-collection mirror 31 again, is then reflected by the first light-collection mirror 31, and reaches the beam splitter 22. Part of the second irradiation light L2 passes through the beam splitter 22 and reaches the light-reception surface of the first light-reception element 41.

In particular, when the second irradiation light L2 that has been reflected by the first light-collection mirror 31 passes through a focal point of the second light-collection mirror 32 as the spherical mirror, the second irradiation light L2 that has been reflected by the second light-collection mirror 32 reaches the first light-collection mirror 31 again. Thus, along the optical path from the second light source 21 to the first light-reception element 41, the second irradiation light L2 can be most efficiently guided to the light-reception surface of the first light-reception element 41.

The particle detection device 100 includes the dirt-level determination unit 73 for receiving the first detection signal D1 outputted from the first light-reception element 41. By using the first detection signal D1 that is an output signal when the second irradiation light L2 is received on the light-reception surface of the first light-reception element 41, the dirt-level determination unit 73 determines the degree of dirt on the light-reflection region of the first light-collection mirror 31 and the light-reflection region of the second light-collection mirror 32 and outputs a value indicating the result of the determination as a dirt level value Y. The dirt level value Y is transmitted to the central processing control unit 63, for example. The central processing control unit 63 makes the result output unit 64 display information based on the dirt level value Y. The user is thus informed of the degree of dirt on the light-collection mirrors. The dirt level value Y can be also used as a barometer for determining the life of the particle detection device 100. The particle detection device 100 may include a memory 74 as a storage unit for storing information used in the dirt-level determination unit 73.

The central processing control unit 63 may correct, based on the dirt level value Y, a particle count number N obtained by the particle counter 71.

Figure 5A:
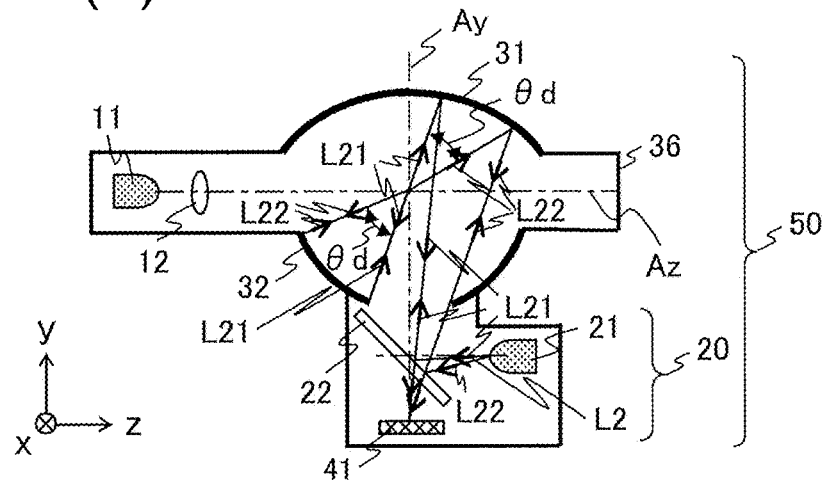
FIG. 5(a) and FIG. 5(b) are diagrams schematically showing paths of second irradiation light when the particle detection device according to the first embodiment performs dirt detection.
Figure 5B:
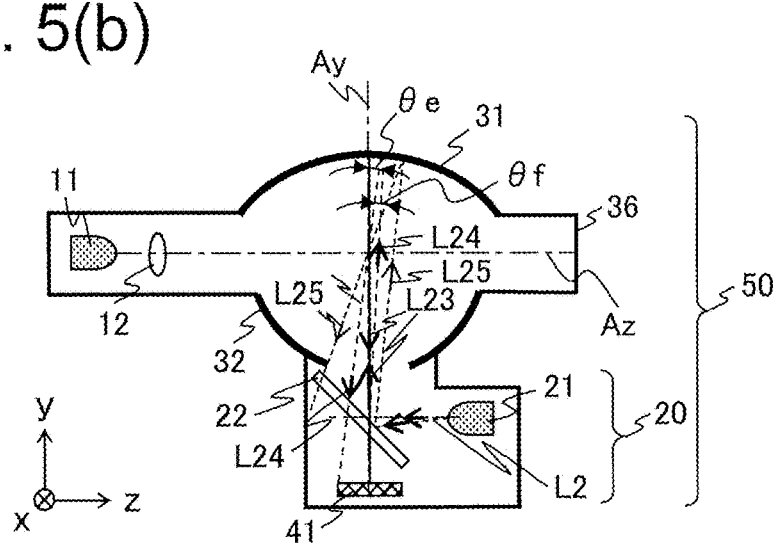

FIG. 5(a) and FIG. 5(b) are diagrams schematically showing paths of the second irradiation light L2 when the particle detection device 100 performs dirt detection. FIG. 5(a) and FIG. 5(b) show representative light rays of the second irradiation light L2.

FIG. 5(a) and FIG. 5(b) show a structure of the optical system 50 in a cross section obtained by cutting it by a plane parallel to a yz plane. However, the light-reflection region of the first light-collection mirror 31 and the light-reflection region of the second light-collection mirror 32 are provided in 360-degree directions around the axis line Ay parallel to the y axis. Hence, the description with reference to FIG. 5(a) and FIG. 5(b) applies to every surface in 360-degree directions around the axis line Ay.

In FIG. 5(a), light rays L21, L22 of the second irradiation light L2 are reflected by the light-reflection region of the first light-collection mirror 31, pass through the first focal point on the ellipsoid-shaped light-reflection region of the first light-collection mirror 31 and then reach the second light-collection mirror 32. Then, the light rays L21, L22 are reflected by the light-reflection region of the second light-collection mirror 32, are then reflected by the light-reflection region of the first light-collection mirror 31 again, pass through the beam splitter 22 and then reach the light-reception surface of the first light-reception element 41. The optical path is referred to as a fourth path. Light rays represented by the fourth path constitute a group of light rays existing in a range of an angle θd formed between the light rays L21 and L22 traveling along the fourth path. The light along the fourth path is affected by light reflection properties of both the first light-collection mirror 31 and the second light-collection mirror 32. Hence, in the dirt detection, by using the light along the fourth path as detection light, the state of dirt on the light-reflection region of the first light-collection mirror 31 and the light-reflection region of the second light-collection mirror 32 can be detected.

In FIG. 5(b), light rays L23, L24 of the second irradiation light L2 are reflected by the light-reflection region of the first light-collection mirror 31, reach the beam splitter 22, then pass through the beam splitter 22 and reach the light-reception surface of the first light-reception element 41. The optical path is referred to as a fifth path. Light rays traveling along the fifth path constitute a group of light rays existing in a range of an angle θe formed between the light rays L23 and L24.

FIG. 5(b) also shows a light ray L25 of the second irradiation light L2 that is reflected by the first light-collection mirror 31, then reaches the beam splitter 22, then passes through the beam splitter 22 and does not reach the light-reception surface of the first light-reception element 41. The optical path is referred to as a sixth path. The light ray L25 represented by the sixth path constitutes a group of light rays existing in a range of an angle θf formed between the light rays L25 and L24 shown in FIG. 5(b).

Since the second irradiation light L2 along the sixth path does not reach the light-reception surface of the first light-reception element 41, it is not used for the dirt detection. If a solid angle of the sixth path is made small, the light use efficiency can be increased. By detecting the second irradiation light L2 along the fourth path and the fifth path by the first light-reception element 41, the degree of dirt on the light-reflection region of the first light-collection mirror 31 and the light-reflection region of the second light-collection mirror 32 can be detected and determined.

It is desirable that the first light-reception element 41 have a wide light-reception surface enough to receive the second irradiation light L2 along the fifth path and the sixth path. In this case, not only the second irradiation light L2 along the fourth path and the fifth path but also the second irradiation light L2 along the sixth path are used for detecting and determining the degree of dirt.

Figure 6:
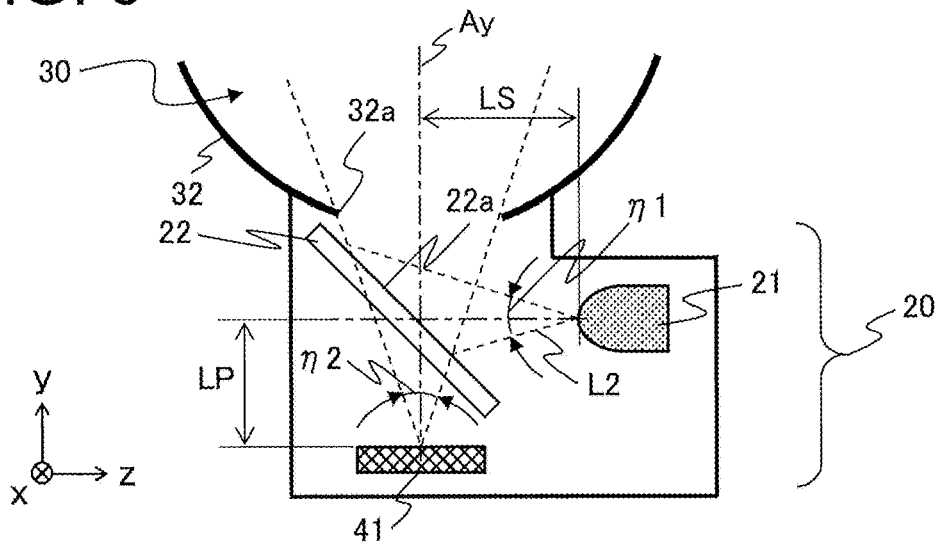
FIG. 6 is a diagram showing a positional relationship between a first light-reception element and a second light source in the particle detection device according to the first embodiment.

FIG. 6 is a diagram showing a positional relationship between the first light-reception element 41 and the second light source 21. FIG. 6 shows the first light-reception element 41, the beam splitter 22, the second light source 21 and the second light-collection mirror 32. FIG. 6 shows a situation that the second irradiation light L2 is emitted from the front surface (that is, the front end) of the second light source 21. However, a light emission point of the second light source 21 may exist at a position other than the front surface of the second light source 21.

FIG. 6 shows a situation that feedback light of the second irradiation light L2 (i.e., reflection light reflected by the first light-collection mirror 31) is collected on the top surface of the first light-reception element 41. However, the light-reception surface of the first light-reception element 41 may exist in a position other than the top surface of the first light-reception element 41; in that case, light is collected on a light-reception surface on the inner side of the top surface of the first light-reception element 41.

The second light source 21 can be disposed at a position such that the second light source 21 and the first light-reception element 41 are in an optically symmetric relationship with respect to the reflection surface 22a of the beam splitter 22. Alternatively, the second light source 21 can be disposed at a position to be optically conjugate to the second focal point of the first light-collection mirror 31. The conjugate position relationship means an optical arrangement relationship that there is a mutual relationship between two elements such that replacing the two elements with each other does not change the properties of the whole.

As shown in FIG. 6, in a case that, along the y axis, the second light source 21 is disposed at a position a distance LS distant from the reflection surface 22a of the beam splitter 22 and the first light-reception element 41 is disposed at a position a distance LP distant from the reflection surface 22a of the beam splitter 22, it is desirable to make the distance LS and the distance LP equal. Thus, the second light source 21 is disposed at a position to be optically conjugate to the second focal point of the first light-collection mirror 31.

If another optical device that is not shown in FIG. 6, such as a lens, is disposed on the optical paths, the distance LS and the distance LP are not actually equal in some cases. In such a case, it is sufficient that there is a substantially optically symmetric relationship between the second light source 21 and the first light-reception element 41 with respect to the reflection surface 22a of the beam splitter 22. Thus, the second light source 21 is disposed at a position to be optically conjugate to the second focal point of the first light-collection mirror 31.

In FIG. 6, the reflection surface 22a of the beam splitter 22 is inclined by approximately 45 degrees with respect to the y axis, the angle can be set to an angle other than 45 degrees.

As described above, the second light source 21 and the first light-reception element 41 are arranged at positions to be in a substantially optically symmetric relationship with respect to the reflection surface 22a of the beam splitter 22 (in other words, the second light source 21 and the first light-reception element 41 are arranged to be optically conjugate to each other). Such an arrangement makes it possible to irradiate, with the second irradiation light L2, a range of incident angles of the scattered light detected by the first light-reception element 41, that is, the light-reflection region of the first light-collection mirror 31 and the light-reflection region of the second light-collection mirror 32 that are substantially used and to guide reflected light to the light-reception surface of the first light-reception element 41.

When the second irradiation light L2 emitted from the second light source 21 passes through an opening 32a as a light-passage region of the second light-collection mirror 32, light rays of the second irradiation light L2 passing through an edge of the opening 32a have a spread of an angle $\eta 1$. On the other hand, when the second irradiation light L2 to reach the light-reception surface of the first light-reception element 41 passes through the opening 32a of the second light-collection mirror 32, light rays of the second irradiation light L2 passing through the edge of the opening 32a are collected at an angle $\eta 2$.

By arranging the second light source 21 and the light-reception surface of the first light-reception element 41 at positions such that they are in a substantially optically symmetric relationship with respect to the reflection surface 22a of the beam splitter 22, the angle $\eta 1$ and the angle $\eta 2$ can be made equal to each other.

Therefore, a wide area of the light-reflection regions of the first light-collection mirror 31 and the second light-collection mirror 32 can be irradiated with the second irradiation light L2 from the second light source 21 and reflection light can be obtained.

This is an effect obtained by arranging the second light source 21 and the light-reception surface of the first light-reception element 41 to be optically conjugate to each other, when the elliptical mirror of the first light-collection mirror 31 has the second focal point at a finite position that is not infinity.

When the beam splitter 22 has light reflectance Rb and light transmittance Tb, the proportion of light reflected by the beam splitter 22 to the second irradiation light L2 emitted from the second light source 21 is Rb/(Rb+Tb) (in an ideal case that there is no loss in the beam splitter 22). For example, the light reflectance Rb and the light transmittance Tb are set to 10% and 90% respectively, and thus the light transmittance Tb is set larger than the light reflectance Rb (that is, Rb<Tb). It is generally desirable to set the light transmittance Tb of the beam splitter 22 larger than the light reflectance Rb, in order to efficiently guide weak scattered light generated at a particle to the light-reception surface of the first light-reception element 41.

In order to detect weak scattered light, it is also desirable to set a gain value of a gain circuit of the particle counter 71 to a high amplification factor of several tens of times or more, in usual. Therefore, in a case that the light transmittance Tb of the beam splitter 22 is small, by setting a high amplification factor, the scattered light can be detected by the first light-reception element 41.

In a case that the light reflectance Rb of the beam splitter 22 is small, the intensity of the second irradiation light L2 that reaches the first light-collection mirror 31 is reduced. Further, the intensity of the second irradiation light L2 reflected by the first light-collection mirror 31 and the second light-collection mirror 32 and then guided to the light-reception surface of the first light-reception element 41 is also reduced. Accordingly, in a case that the light amount of the second irradiation light L2 guided to the light-reception surface of the first light-reception element 41 is insufficient, by setting the amplification factor of the gain circuit in the dirt-level determination unit 73 to be high, it is possible to set the signal level to be appropriate in the dirt-detection optical system 20. On the other hand, in a case that the light amount of the second irradiation light L2 guided to the light-reception surface of the first light-reception element 41 is sufficiently large, it is desirable to set the amplification factor of the gain circuit of the dirt-level determination unit 73 to be low.

In order to obtain an appropriate signal level, the gain circuit of the dirt-level determination unit 73 can be a variable amplifier circuit.

The setting of the signal level in the dirt detection optical system 20 to be appropriate can be achieved by adjusting the light amount of the second irradiation light L2 emitted from the second light source 21, instead of adjusting setting of the amplification factor of the gain circuit. Alternatively, these (i.e., the adjustment of the amplification factor of the gain circuit and the adjustment of the light amount of the second irradiation light L2) can be used in combination.

Further, by setting the light reflectance Rb and the light transmittance Tb of the beam splitter 22 so as to obtain the light amount substantially the same as the light amount of the scattered light generated at the particle, the need for the variable amplifier circuit of the dirt-level determination unit 73 can be eliminated and therefore the circuit configuration can be simplified.

By means of the adjustment of the amplification factor of the gain circuit or the adjustment of the light amount of the second irradiation light L2, the beam splitter 22 can be provided with a property that the light reflectance Rb is a value not less than the light transmittance Tb. In other words, they may be set as Rb Tb.

The dirt detection optical system 20 may include an optical member such as a lens for adjusting a divergence angle of the second irradiation light L2 emitted from the second light source 21.

(1-4) Operation by Particle Detection Device

Next, particle counting operation and dirt detection operation by the particle detection device 100 according to the first embodiment will be described.

Figure 7:
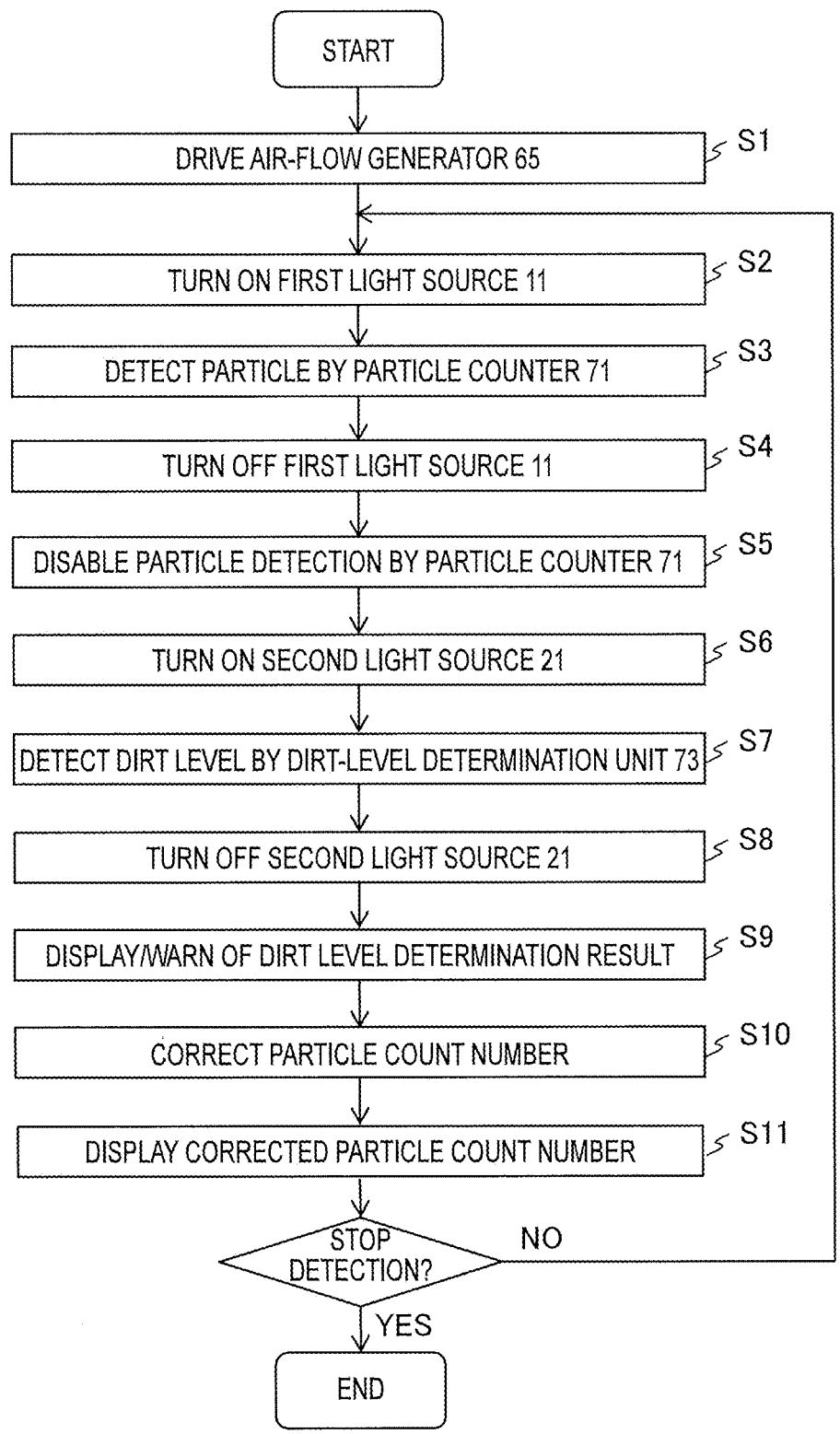
FIG. 7 is a flowchart showing operation by the particle detection device according to the first embodiment.

FIG. 7 is a flowchart showing operation by the particle detection device 100. The particle detection device 100 can operate according to steps S1 to S11 in FIG. 7. The central processing control unit 63 controls the operation indicated as steps S1 to S11. FIG. 7 shows an example of the operation and the example of FIG. 7 does not limit operation by the particle detection device 100.

The main power of the particle detection device 100 is turned on and the first light-source driver 61 and the second light-source driver 62 are in a state of waiting start of the operation, i.e., a stand-by state. Meanwhile, the particle counter 71, the dirt-level determination unit 73 and the result output unit 64 are in a state of capable of starting processing if the first detection signal D1 from the first light-reception element 41 is inputted.

The series of operation steps shown in FIG. 7 includes, as main functions of the particle detection device 100, a process for performing particle counting (steps S1 through S3), a process for detecting a dirt level value (steps S4 through S8) and a process for performing correction of a particle count value and the like according to the dirt level value (steps S9 through S11). Instead of the process for correcting the particle count value or in addition to the process for correcting the particle count value, a process for adjusting a threshold voltage $V_{th}$ for the particle counting by the particle counter 71 may be performed according to the dirt level value.

In the particle detection device 100 in FIG. 1, a process for correcting a particle count value N is performed. In the particle detection device 101 in FIG. 3, a process for adjusting the threshold voltage $V_{th}$ for the particle counting by the particle counter 71 is performed according to the dirt level value.

In step S1 in FIG. 7, the air-flow generator 65 starts to be driven. Accordingly, air in which particles are floating is sucked into the inside of the optical system 50 of the particle detection device 100. Meanwhile, an air-intake volume (or a flow rate) V by the air-flow generator 65 per unit time is held in an internal memory of the central processing control unit 63 to be used for calculating the number concentration or the mass concentration by the particle counter 71. The air-intake volume V can be an output value from a flow-rate sensor (not shown) or the like or can be a value of an air-intake flow rate that the air-flow generator 65 has in advance.

In step S2, the first light source 11 is turned on. Accordingly, a particle is irradiated with the first irradiation light L1, scattered light generated at the particle is received by the first light-reception element 41 and then a first detection signal D1 is outputted from the first light-reception element 41.

In step S3, the particle counter 71 performs calculation based on the first detection signal D1, that is, determination. Meanwhile, the particle counter 71 calculates the particle number concentration or the particle mass concentration, by using the air-intake volume V held in the internal memory of the central processing control unit 63. In addition, the particle count number calculated by the particle counter 71 and the value of the number concentration or the mass concentration can be held in the internal memory of the central processing control unit 63.

The value of the number concentration or the mass concentration can be calculated by dividing the particle count value N by the air-intake volume (or the flow rate) V per unit time, and then dividing the division result by a conversion value K (this value is a known value determined in optical design) with a consideration for a ratio of an effective volume of a space actually irradiated with the first irradiation light L1 to the the air-intake volume V.

Steps S4 through S8 corresponding to the dirt detection operation include: a light reception process (steps S6 and S7) in which the second irradiation light L2 from the second light source 21 is reflected by the first light-collection mirror 31 and the second light-collection mirror 32 and the power of the reflected light is actually acquired by the first light-reception element 41; and a preceding process (steps S4 and S5) and a subsequent process (step S8) for the light reception process.

In step S4, the first light source 11 is turned off or the power of the first irradiation light L1 is lowered to a negligible level. Thus, in this state, the scattered light generated at the particle has no influence on the detection of the dirt level value.

In step S5, the particle detection by the particle counter 71 is stopped or disabled. Thus, in this state, as in the case of step S4, the scattered light has no influence on the detection of the dirt level value. In the light reception process described later, it is possible to obtain the particle count value or the value of the number concentration or the value of the mass concentration, exclusive of the particle counting or the air-intake volume (flow rate).

When the scattered light generated at the particle is sufficiently small compared to the second irradiation light L2 from the second light source 21, the scattered light has small influence on the detection of the dirt level value and thus execution of the process of steps S4 and S5 can be eliminated.

In step S6, the second light source 21 is turned on. Accordingly, the first light-collection mirror 31 and the second light-collection mirror 32 are irradiated with the second irradiation light L2 emitted from the second light source 21, light reflected by the first light-collection mirror 31 and the second light-collection mirror 32 is made incident on the first light-reception element 41 and then the first light-reception element 41 outputs the detection signal D1.

In step S7, the dirt-level determination unit 73 acquires a dirt level value Y. Accordingly, the dirt level value converted based on the first detection signal D1 outputted from the first light-reception element 41 can be acquired. The acquired dirt level value Y is compared with an initial value $Y_0$ of the dirt level value (for example, compared based on a value of the difference or the ratio between them) and thus determination of the dirt level value Y is performed. The initial value $Y_0$ of the dirt level value is held in the memory 74 so as to be used for determining the dirt level value Y by the dirt-level determination unit 73. The initial value $Y_0$ of the dirt level value may be a past dirt level value acquired by the dirt-level determination unit 73 or a preset initial dirt level value.

In step S8, the second light source 21 is turned off. The dirt detection process is thus finished.

In step S9, the result output unit 64 displays the result of the determination of the dirt level to provide the user with information based on the dirt level value.

In step S10, the central processing control unit 63 corrects the particle count number N according to the dirt level value Y. In the correction, the particle count number, the number concentration or the mass concentration that are held in the internal memory of the central processing control unit 63 are corrected by using the dirt level value Y acquired by the dirt-level determination unit 73. In addition, the corrected value of the particle count number, the corrected value of the number concentration or the corrected value of the mass concentration can be held in the internal memory of the central processing control unit 63.

The process for correcting the particle count number according to the dirt level value performed in step S10 can be performed by using equation (1) or equation (2), for example:

$$N_c = (Y/Y_0) \times N = ((Y_0 + \Delta Y)/Y_0) \times N \quad (1)$$

$$N_c = (Y_0/(Y_0 - \Delta Y)) \times N \quad (2)$$

where Y denotes the dirt level value, $N_c$ denotes the corrected particle count number, N denotes the particle count number before the correction and $\Delta Y$ denotes an increase from the initial value $Y_0$ of the dirt level value.

In step S10, as another method for correcting the particle count number differing from the above, it is possible to use a method of adjusting the threshold voltage $V_{th}$ for the particle counting by the particle counter 71 according to the dirt level value. Here, $V_{th}$ denotes a threshold voltage before the correction. FIG. 3 is a diagram corresponding to this. Although step S10 in FIG. 7 states that 'correct particle count number', it should state that 'correct threshold voltage' in this case.

Specifically, the adjustment of the threshold voltage $V_{th}$ for the particle counting by the particle counter 71 can be performed according to the dirt level value, by using equation (3) or equation (4), for example.

$$V_{thc} = (Y_0/Y) \times V_{th} = (Y_0/(Y_0 + \Delta Y)) \times V_{th} \quad (3)$$

$$V_{thc} = ((Y_0 - \Delta Y)/Y_0) \times V_{th} \quad (4)$$

where $V_{thc}$ denotes a corrected threshold voltage for the particle counting.

The correction and the adjustment described above can be used when dirt is adhered to the first light-collection mirror 31 or the second light-collection mirror 32 and thus it causes a decrease in the light amount of the scattered light that reaches the light-reception surface of the first light-reception element 41. By reducing the threshold voltage $V_{th}$ to an appropriate voltage value so that the particle number concentration or the particle mass concentration is accurate, it is possible to suppress a decrease in the particle count value caused by that the light amount of the scattered light is small and it is possible to calculate the particle number concentration or the particle mass concentration more accurately.

In step S11, the corrected value of the particle count number, the number concentration or the mass concentration is displayed on the result output unit 64. This makes it possible to provide the user with more accurate information.

In addition to the above operation, other operation can be additionally performed.

Instead of the processes of steps S4 and S8 in FIG. 7, a process for preventing taking air into the particle detection device 100 may be added. For example, operation for stopping the air-flow generator 65 may be inserted between steps S5 and S7.

(1-5) Effect

As described above, the particle detection device 100 and 101 according to the first embodiment can determine the number, the weight and types of floating particles. The particle detection devices 100 and 101 can also calculate the particle concentration or the mass concentration of the floating particles.

Further, the particle detection device 100 and 101 can detect the degree of dirt on the optical system 50 that guides scattered light generated at a particle to the light-reception surface of the first light-reception element 41. Furthermore, the particle detection devices 100 and 101 can correct the particle count value or can adjust the threshold voltage according to the dirt level value of the optical system 50.

(2) Second Embodiment (2-1) Configuration in Second Embodiment

Figure 8:
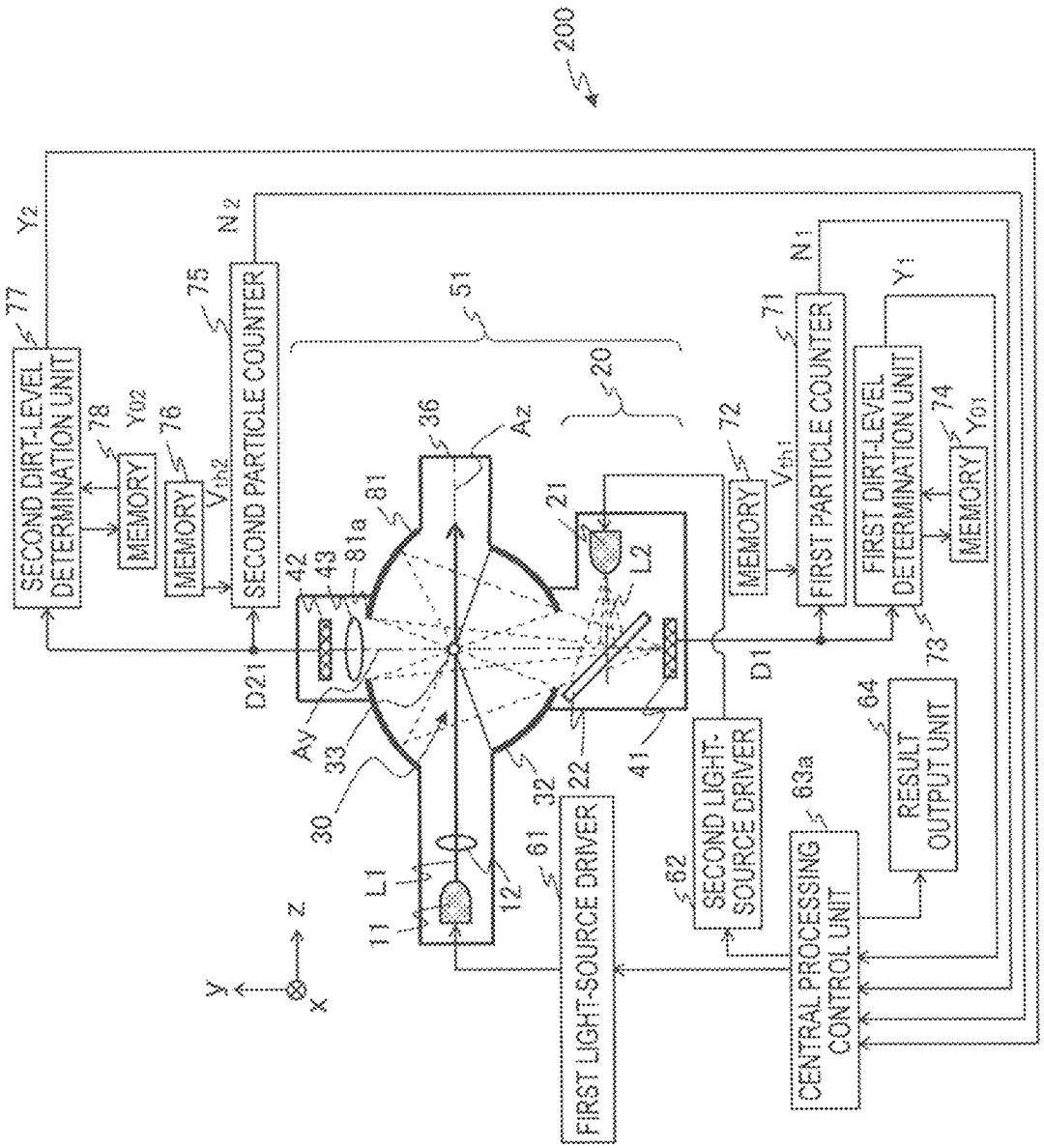
FIG. 8 is a diagram schematically showing a configuration of an optical system and a configuration of a control system of a particle detection device according to a second embodiment.

FIG. 8 is a diagram schematically showing a configuration of an optical system 51 and a configuration of a control system of a particle detection device 200 according to a second embodiment. FIG. 8 shows a structure of the optical system 51 in a cross section obtained by cutting it by a plane parallel to a yz plane. FIG. 8 shows components of the control system as functional blocks. In FIG. 8, components identical to or corresponding to the components shown in FIG. 1 are assigned the same reference numerals as the reference numerals shown in FIG. 1. A cross section of the optical system 51 and an air flow path of the particle detection device 200 obtained by cutting them by a plane parallel to a zx plane is similar to that in FIG. 2.

The first light-collection mirror 81 in the particle detection device 200 according to the second embodiment includes an opening 81a as a light-passage region in part of a light-reflection region. Part of scattered light generated at a particle passes through the opening 81a and then reaches a light-reception surface of a second light-reception element 42. The particle detection device 200 includes the second light-reception element 42 for detecting the scattered light passing through the opening 81a. A lens 43 may be disposed before the second light-reception element 42. The lens 43 is a light-collection lens for guiding the scattered light that has been generated at the particle and has then passed through the opening 81a to the light-reception surface of the second light-reception element 42, for example.

Before the second light-reception element 42 in FIG. 8, it is possible to dispose a component for separating scattered light into polarization components to perform polarization detection or a component for performing waveform detection including a waveform filter for extracting fluorescence or Raman scattered light or the like.

The particle detection device 200 can include a second particle counter 75 and a second dirt-level determination unit 77 that receive a second detection signal D2 outputted from the second light-reception element 42.

A first particle counter 71 and a first dirt-level determination unit 73 are substantially the same as the particle counter 71 and the dirt-level determination unit 73 in the first embodiment respectively. A particle count number $N_1$ and a dirt level value $Y_1$ outputted from the first particle counter 71 and the first dirt-level determination unit 73 are substantially the same as the particle count number N and the dirt level value Y in the first embodiment respectively.

The second light-reception element 42 shown in FIG. 8 detects scattered light that has been generated at a particle and then has passed through the opening 81a, thereby outputting the second detection signal D2. The second detection signal D2 is used for detecting types of particles, the particle number concentration or the particle mass concentration. The second particle counter 75 outputs types of particles, the particle number concentration or the particle mass concentration, according to the above mentioned various uses of the detection.

The second dirt-level determination unit 77 is a signal processor for monitoring the degree of dirt on the lens 43 or change in light transmittance of the lens 43. The second irradiation light L2 emitted from the second light source 21 passes through the opening 81a of the first light-collection mirror 81, passes through the lens 43 and then reaches the light-reception surface of the second light-reception element 42. The second dirt-level determination unit 77 detects the degree of dirt on the lens 43 or change in light transmittance is detected on the basis of the second detection signal D2 outputted from the second light-reception element 42, and the second dirt-level determination unit 77 then outputs a dirt level value $Y_2$ regarding the lens 43.

The first particle counter 71, the first dirt-level determination unit 73, the second particle counter 75, the second dirt-level determination unit 77 and a central processing control unit 63a constitute a control section for controlling the entire operation of the particle detection device 200.

If the dirt level value $Y_2$ is transmitted to the central processing control unit 63a and the dirt level value regarding the lens 43 is displayed by the result output unit 64, for example, the user can be informed of the degree of dirt on the lens 43, hence it is used as a barometer of the life of the particle detection device 200 or the like.

On the basis of the dirt level value $Y_2$, an error in the particle count number $N_2$ acquired by the second particle counter 75 may be corrected.

In the optical system 51 of the particle detection device 200 according to the second embodiment, there are two types of paths along which scattered light generated at a particle is guided to the light-reception surface of the first light-reception element 41 and one type of path along which the scattered light is guided to the light-reception surface of the second light-reception element 42.

(2-2) Particle Detection

Next, the following gives a description of a relationship between scattered light when the first light source 11 emits the first irradiation light L1 and the first detection signal D1 outputted from the first light-reception element 41 in the particle detection device 200. FIG. 9(a) through FIG. 9(d) are diagrams schematically showing paths of the first irradiation light L1 and paths of the scattered light when the particle detection device 200 performs particle detection. FIG. 9(a) through FIG. 9(d) show representative light rays of the scattered light.

FIG. 9(a) through FIG. 9(d) show a structure of the optical system 51 in a cross section obtained by cutting it by a plane parallel to a yz plane. However, the light-reflection region of the first light-collection mirror 81 and the light-reflection region of the second light-collection mirror 32 is provided in 360-degree directions around the axis line Ay parallel to the y axis. Hence, the description with reference to FIG. 9(a) through FIG. 9(d) applies to every surface in 360-degree directions around the axis line Ay.

Figure 9A:
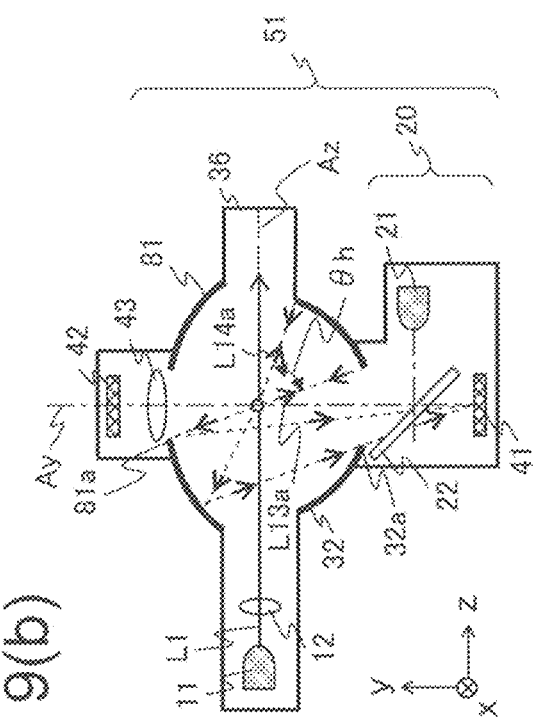
FIG. 9(a) to FIG. 9(d) are diagrams schematically showing paths of first irradiation light and paths of scattered light when the particle detection device according to the second embodiment performs particle detection.

FIG. 9(a) shows light rays of scattered light generated when a particle at the detection position 33 is irradiated with the first irradiation light L1; the light rays are reflected by the first light-collection mirror 81, then pass through the beam splitter 22 and then reach the light-reception surface of the first light-reception element 41 (e.g., light rays L11a, L12a traveling along a sixth path in FIG. 9(a)). The optical path is referred to as the sixth path. Scattered light rays represented by the sixth path constitute a group of light rays existing in a range of an angle θg formed between the light rays L11a and L12a traveling along the sixth path. Part of the scattered light that has reached the beam splitter 22 is reflected and then travels toward the position of the second light source 21 or its vicinity.

Figure 9B:
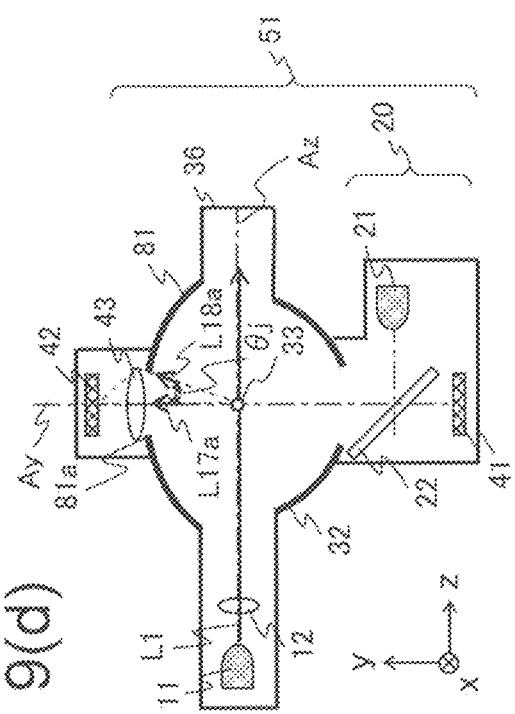

FIG. 9(b) shows light rays of the scattered light generated when the particle at the detection position 33 is irradiated with the first irradiation light L1; the light rays are reflected by the second light-collection mirror 32, are then reflected by the first light-collection mirror 81, then pass through the beam splitter 22 and then reach the light-reception surface of the first light-reception element 41 (e.g., light rays L13a, L14a traveling along a seventh path in FIG. 9(b)). The optical path is referred to as the seventh path. Scattered light rays represented by the seventh path constitute a group of light rays existing in a range of an angle θh formed between the light rays L13a and L14a traveling along the seventh path. Part of the scattered light that has reached the beam splitter 22 is reflected and then travels toward the position of the second light source 21 or its vicinity.

Figure 9C:
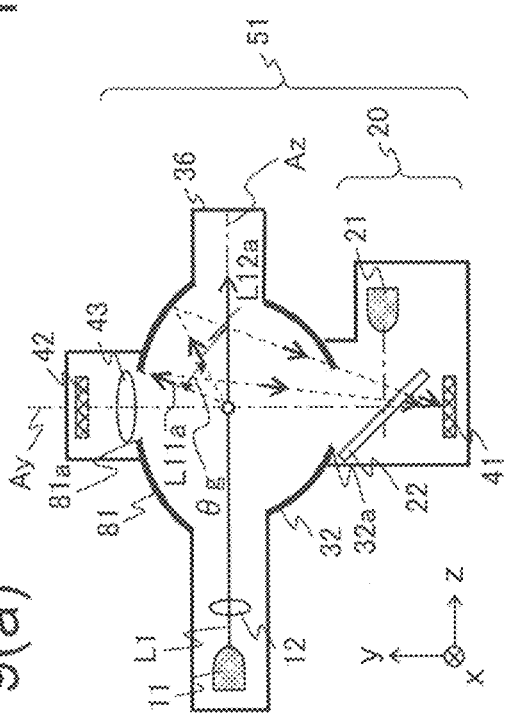

FIG. 9(c) shows light rays of the scattered light generated when the particle at the detection position 33 is irradiated with the first irradiation light L1; the light rays are reflected by neither the first light-collection mirror 81 nor the second light-collection mirror 32, directly reach the beam splitter 22, then pass through the beam splitter 22 and then reach the light-reception surface of the first light-reception element 41 (e.g., light rays L15a, L16a traveling along an eighth path, in FIG. 9(c)). The optical path is referred to as the eighth path. Scattered light rays represented by the eighth path constitute a group of light rays existing in a range of an angle θi formed between the light rays L15a and L16a traveling along the eighth path. Part of the scattered light that has reached the beam splitter 22 is reflected and then travels toward the position of the second light source 21 or its vicinity.

Figure 9D:
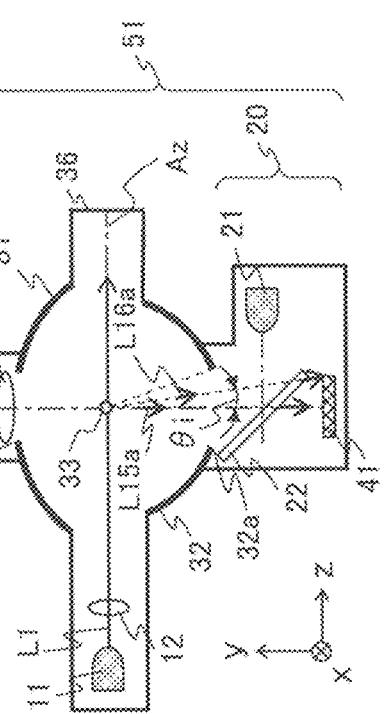

FIG. 9(d) shows light rays of the scattered light generated when the particle at the detection position 33 is irradiated with the first irradiation light L1; the light rays are reflected by neither the first light-collection mirror 81 nor the second light-collection mirror 32, pass through the opening 81a and then directly reach the second light-reception element 42, that is, the light rays pass through the lens 43 and then reaches the light-reception surface of the second light-reception element 42. The optical path is referred to as a ninth path. Scattered light rays represented by the ninth path constitute a group of light rays existing in a range of an angle θj formed between light rays L17a and L18a traveling along the ninth path.

As described above, the scattered light is guided to the light-reception surface of the first light-reception element 41 along the sixth path, the seventh path and the eighth path, and another detection function by means of the second light-reception element 42 through the ninth path is provided. Therefore, the scattered-light detection efficiency is improved. Further, the improvement of the scattered-light detection efficiency makes it possible to improve the accuracy of detecting the particle number concentration or the particle mass concentration.

(2-3) Dirt Detection

Figure 10B:
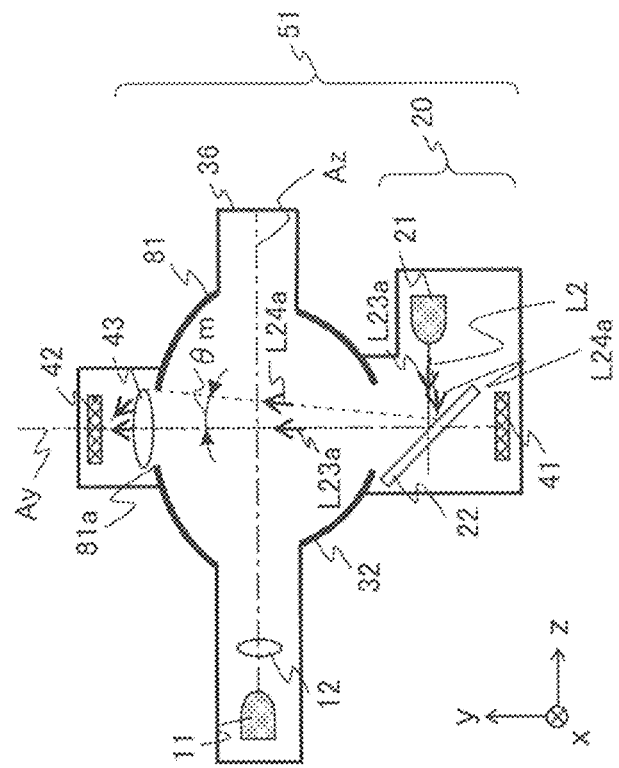
FIG. 10(a) and FIG. 10(b) are diagrams schematically showing paths of second irradiation light when the particle detection device according to the second embodiment performs dirt detection.
Figure 10A:
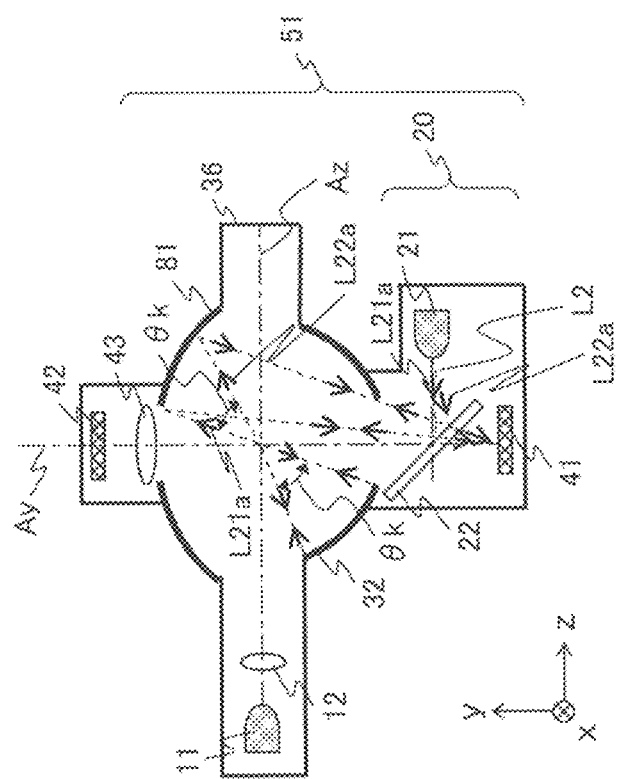

FIG. 10(a) and FIG. 10(b) are diagrams schematically showing paths of the second irradiation light L2 when the particle detection device 200 performs dirt detection. FIG. 10(a) and FIG. 10(b) show representative light rays of the second irradiation light L2.

FIG. 10(a) and FIG. 10(b) show a structure of the optical system 51 in a cross section obtained by cutting it by a plane parallel to a yz plane. However, the light-reflection region of the first light-collection mirror 81 and the light-reflection region of the second light-collection mirror 32 are provided in 360-degree directions around the axis line Ay parallel to the y axis. Hence, the description with reference to FIG. 10(a) and FIG. 10(b) applies to every surface in 360-degree directions around the axis line Ay.

In FIG. 10(a), light rays L21a, L22a of the second irradiation light L2 are reflected by the light-reflection region of the first light-collection mirror 81, pass through the first focal point of the ellipsoid-shaped light-reflection region of the first light-collection mirror 81 and then reach the second light-collection mirror 32. Then, the light rays L21a, L22a are reflected by the light-reflection region of the second light-collection mirror 32, are reflected by the light-reflection region of the first light-collection mirror 81 again, then pass through the beam splitter 22 and then reach the light-reception surface of the first light-reception element 41. The optical path is referred to as a tenth path. Light rays traveling along the tenth path constitute a group of light rays existing in a range of an angle θk formed between the light rays L21a and L22a. The tenth path is substantially the same as the fourth path in the particle detection device 100 shown in FIG. 5(a). Hence, detection of the second irradiation light L2 along the tenth path by the first light-reception element 41 makes it possible to detect and determine the degree of dirt on the first light-collection mirror 81 and the second light-collection mirror 32.

FIG. 10(b) shows light rays of the second irradiation light L23a and L24a that are light rays of the second irradiation light L2 that pass through the opening 81a as the light-passage region of the first light-collection mirror 81, then pass through the lens 43 and then reach the light-reception surface of the second light-reception element 42. The optical path is referred to as an eleventh path. Light rays represented by the eleventh path constitute a group of light rays existing in a range of an angle θm formed between light rays L23a and L24a traveling along the eleventh path. Further, detection of the light traveling along the eleventh path by the second light-reception element 42 makes it possible to detect and determine the degree of dirt on the lens 43.

(2-4) Operation by Particle Detection Device

Next, the following gives a description of particle counting operation and dirt detection operation by the particle detection device 200 according to the second embodiment.

Figure 11:
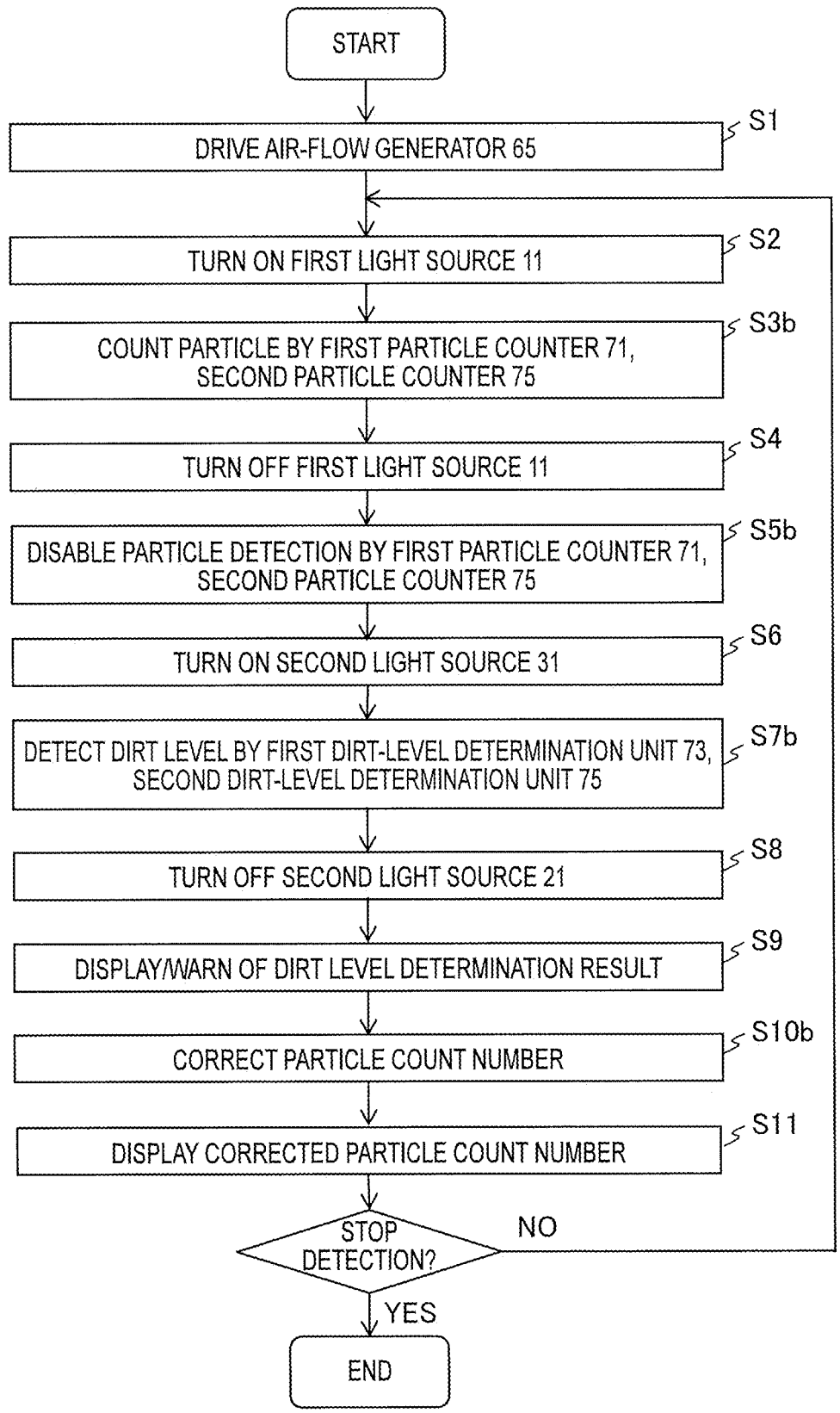
FIG. 11 is a flowchart showing operation by the particle detection device according to the second embodiment.

FIG. 11 is a flowchart showing the operation by the particle detection device 200. The particle detection device 200 can operate in the order of steps S1, S2, S3b, S4, S5b, S6, S7b, S8, S9, S10b and S11 in FIG. 11 (the process can be returned to step S2, if necessary). The operation in steps S1, S2, S4, S6, S8 and S9 in FIG. 11 are the same as the operation in corresponding steps shown in FIG. 7.

The operation by the particle detection device 200 differs from the operation by the particle detection device 100 according to the first embodiment in that operation by the second light-reception element 42, operation by the second dirt-level determination unit 77 and operation by the second particle counter 75 are added.

The series of operation steps shown in FIG. 11 is similar to that in the case of the particle detection device 100 according to the first embodiment and includes, as main functions of the particle detection device 200, a process for performing particle counting, a process for detecting a dirt level value and a process for correcting a particle count value according to the dirt level value. Instead of the process for correcting the particle count value or in addition to the process for correcting the particle count value, a process for adjusting threshold voltages $V_{th1c}$, $V_{th2c}$ for the particle counting by the first particle counter 71 according to the dirt level value may be performed.

Further, in the particle detection device 200 in FIG. 8, a process for correcting particle count values $N_1$, $N_2$ according to dirt level values $Y_1$, $Y_2$ is performed.

Figure 12:
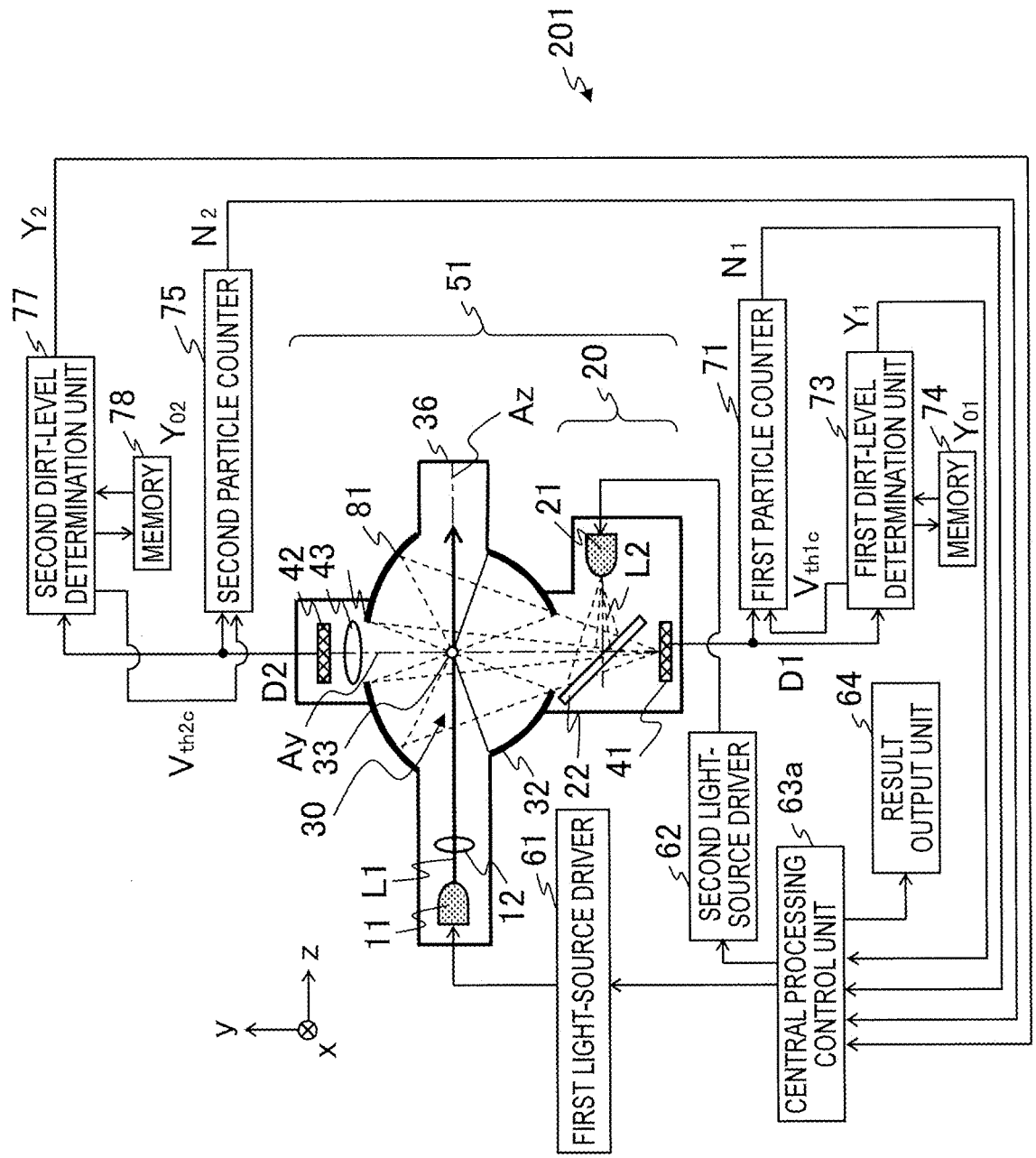
FIG. 12 is a diagram schematically showing a configuration of an optical system and a configuration of a control system of a particle detection device according to a modification example of the second embodiment.

FIG. 12 is a diagram schematically showing a configuration of an optical system and a configuration of a control system of a particle detection device 201 according to a modification example of the second embodiment. In FIG. 12, components identical to or corresponding to the components shown in FIG. 8 are assigned the same reference numerals as the reference numerals shown in FIG. 8. The particle detection device 201 shown in FIG. 12 differs from the particle detection device 200 shown in FIG. 8 in that the first particle counter 71 receives a threshold voltage $V_{th1}$ from the first dirt-level determination unit 73 and that the second particle counter 75 receives a threshold voltage $V_{th2}$ from the second dirt-level determination unit 77. Except for the differences, the particle detection device 201 shown in FIG. 12 is the same as the particle detection device 200 shown in FIG. 8.

The operation by the particle detection device 200 shown in FIG. 11 differ from the operation by the particle detection device 100 shown in FIG. 7 in processes in steps S3b, S5b, S7b and S10b.

The central processing control unit 63a controls the operation in the steps shown in FIG. 11. The operation in FIG. 11 is an example and operation by the particle detection device 200 is not limited to the example of FIG. 11.

When the main power of the particle detection device 200 is turned on, the state of the first light-source driver 61 and the second light-source driver 62 becomes an operation start waiting state, that is, a stand-by state. Meanwhile, the first particle counter 71, the first dirt-level determination unit 73, the second particle counter 75, the second dirt-level determination unit 77 and the result output unit 64 are ready to start processing if a first detection signal D1 from the first light-reception element 41 and a second detection signal D2 outputted from the second light-reception element 42 are inputted.

In step S3b, the first particle counter 71 and the second particle counter 75 perform particle detection. In step S3b, like in the case of step S3 in FIG. 7, the first particle counter 71 and the second particle counter 75 perform particle detection on the basis of the first detection signal D1. Meanwhile, each of the first particle counter 71 and the second particle counter 75 performs calculation of the particle number concentration or the particle mass concentration, by using the air-intake volume V per unit time held in an internal memory of the central processing control unit 63a. In addition, the value of the particle count number, the number concentration or the mass concentration calculated by the first particle counter 71 and the second particle counter 75 can be held in the internal memory of the central processing control unit 63a.

In step S5b, the particle detection by the first particle counter 71 and the second particle counter 75 is stopped or disabled. Therefore, like in the case of step S5 in FIG. 7, scattered light does not adversely affect detection of a dirt level value.

In step S7b, each of the first dirt-level determination unit 73 and the second dirt-level determination unit 77 performs detection of a dirt level value. Accordingly, on the basis of the first detection signal D1 outputted from the first light-reception element 41 and the second detection signal D2 outputted from the second light-reception element 42, dirt level values can be acquired. The dirt level values acquired here are compared with respective initial values of the dirt level values $Y_{01}$ and $Y_{02}$ and thus determination of the dirt level values is performed. The initial values of the dirt level values $Y_{01}$ and $Y_{02}$ can be held in the memory 74 and a memory 78 respectively so as to be used for determining the dirt level values by the first dirt-level determination unit 73 and the second dirt-level determination unit 77 respectively. As the initial value of the dirt level value $Y_{01}$, a past dirt level value acquired by the first dirt-level determination unit 73 or a preset initial dirt level value can be used. As the initial value of the dirt level value $Y_{02}$, a past dirt level value acquired by the second dirt-level determination unit 77 or a preset initial dirt level value can be used.

In step S10b, the particle count number or the threshold voltage for the particle counting is corrected according to the dirt level value. FIG. 8 is a diagram corresponding to this. Accordingly, the particle count numbers $N_1$ and $N_2$ and values of the number concentration or the mass concentration calculated by the first particle counter 71 and the second particle counter 75 that are held in the internal memory of the central processing control unit 63a are corrected, by using the first dirt level value $Y_1$ and the second dirt level value $Y_2$ acquired by the first dirt-level determination unit 73 and the second dirt-level determination unit 77 respectively or by using the threshold voltages $V_{th1}$ and $V_{th2}$ applied to the first particle counter 71 and the second particle counter 75 respectively. In addition, the corrected values of the particle count numbers, the number concentration or the mass concentration can be held in the internal memory of the central processing control unit 63a. The particle detection device 200 may have a memory 76 as a storage unit for storing information used by the second particle counter 75.

The threshold voltage $V_{th1}$ applied to the first particle counter 71 is the same as the threshold voltage $V_{th}$ in the first embodiment. As to the threshold voltage $V_{th2}$ applied to the second particle counter 75, the threshold voltage $V_{th2}$ for particle counting is set for a pulse-like or spike-like electrical output waveform (e.g., voltage waveform) that is the second detection signal D2 outputted from the second light-reception element 42 in accordance with a light amount (i.e., optical power) of scattered light generated at each of a plurality of particles passing through the detection position, the number of waveforms exceeding the threshold voltage $V_{th\_2}$ is counted, and a resultant count value can be made to correspond to the number of detected particles.

As the threshold voltage $V_{th2}$, a plurality of different threshold voltages $V_{th2\_1}$, $V_{th2\_2}$, ..., $V_{th2\_k}$ can be set. By comparing the plurality of different threshold voltages $V_{th2\_1}$, $V_{th2\_2}$, $V_{th2\_k}$ with the electrical output waveform, the sizes of particles can be substantially discriminated. In other words, the size of a particle can be determined on the basis of the electrical output waveform.

A value held in the memory 76 in advance is read out and can be used as the threshold voltage $V_{th2}$ for particle counting.

The process for correcting the particle count number $N_1$ according to the first dirt level value $Y_1$ performed in step S10b can be performed by using equation (5) or equation (6), when the first dirt level value is denoted by $Y_1$, for example:

$$N_{c1}=(Y_1/Y_{01})\times N_1=((Y_{01}+\Delta Y_1)/Y_{01})\times N_1 \quad (5)$$

$$N_{c1}=(Y_{01}/(Y_{01}-\Delta Y_1))\times N_1 \quad (6)$$

where $N_{c1}$ denotes the corrected particle count number, $N_1$ denotes the particle count number before the correction and $\Delta Y_1$ denotes an increase from the initial dirt level value $Y_{01}$.

The process for correcting the particle count number $N_2$ according to the second dirt level value $Y_2$ performed in step S10b can be performed by using equation (7) or equation (8), when the second dirt level value is denoted by $Y_2$, for example:

$$N_{c2}=(Y_2/Y_{02})\times N_2=((Y_{02}+\Delta Y_2)/Y_{02})\times N_2 \quad (7)$$

$$N_{c2}=(Y_{02}/(Y_{02}-\Delta Y_2))\times N_2 \quad (8)$$

where $N_{c2}$ denotes the corrected particle count number, $N_2$ denotes the particle count number before the correction and $\Delta Y_2$ denotes an increase from the initial dirt level value $Y_{02}$.

In step S10b, as another method of correcting the particle number other than the above, it is possible to use a method of correcting the threshold voltage $V_{th1}$ for particle counting by the first particle counter 71 according to the first dirt level value $Y_1$ or a method of correcting the threshold voltage $V_{th2}$ for particle counting by the second particle counter 75 according to the second dirt level value $Y_2$. FIG. 12 is a diagram corresponding to this.

In FIG. 11, step S10b states that 'correct particle count number', for convenience; however, in this case, it should be stated that 'correct threshold voltage'.

Specifically, adjustment of the threshold voltage $V_{th1}$ for particle counting by the first particle counter 71 can be performed according to the first dirt level value $Y_1$ by using equation (9) or equation (10), for example:

$$V_{th1c}=(Y_{01}/Y_1)\times V_{th1}=(Y_{01}/(Y_{01}+\Delta Y_1))\times V_{th1} \quad (9)$$

$$V_{th1c}=((Y_{01}-\Delta Y_1)/Y_{01})\times V_{th1} \quad (10)$$

where $V_{th1c}$ denotes a corrected threshold voltage for particle counting.

Further, adjustment of the threshold voltage $V_{th2}$ for particle counting by the second particle counter 75 can be performed according to the second dirt level value $Y_2$ by using equation (11) or equation (12), for example:

$$V_{th2c}=(Y_{02}/Y_2)\times V_{th2}=(Y_{02}/(Y_{02}+\Delta Y_2))\times V_{th2} \quad (11)$$

$$V_{th2c}=((Y_{02}-\Delta Y_2)/Y_{02})\times V_{th2} \quad (12)$$

where $V_{th2c}$ denotes a corrected threshold voltage for particle counting.

The above correction and adjustment can be used, when the light amount of the scattered light that reaches the light-reception surface of the first light-reception element 41 decreases due to dirt on the first light-collection mirror 81 or the second light-collection mirror 32, or when dirt is adhered to the lens 43, or when the light transmittance of the lens 43 changes. By reducing the threshold voltages $V_{th1c}$, $V_{th2c}$ to appropriate voltage values so that the particle number concentration or the particle mass concentration is accurate, it is possible to suppress a decrease in the particle count value caused by that the light amount of scattered light is small and to calculate the particle number concentration or the particle mass concentration more accurately.

(2-5) Effect

As described above, the particle detection devices 200 and 201 according to the second embodiment can determine the number, the weight and types of floating particles. The particle detection devices 200 and 201 can also calculate the particle concentration or the mass concentration of the floating particles.

Further, the particle detection devices 200 and 201 can detect the degree of dirt in the optical system 51 that guides scattered light generated at a particle to the light-reception surface of the first light-reception element 41 and the degree of dirt on the lens that guides the scattered light to the light-reception surface of the second light-reception element 42. Furthermore, the particle detection devices 200 and 201 can correct the first and second particle count values or adjust the threshold voltages according to the dirt level values.

(3) Third Embodiment

Figure 13:
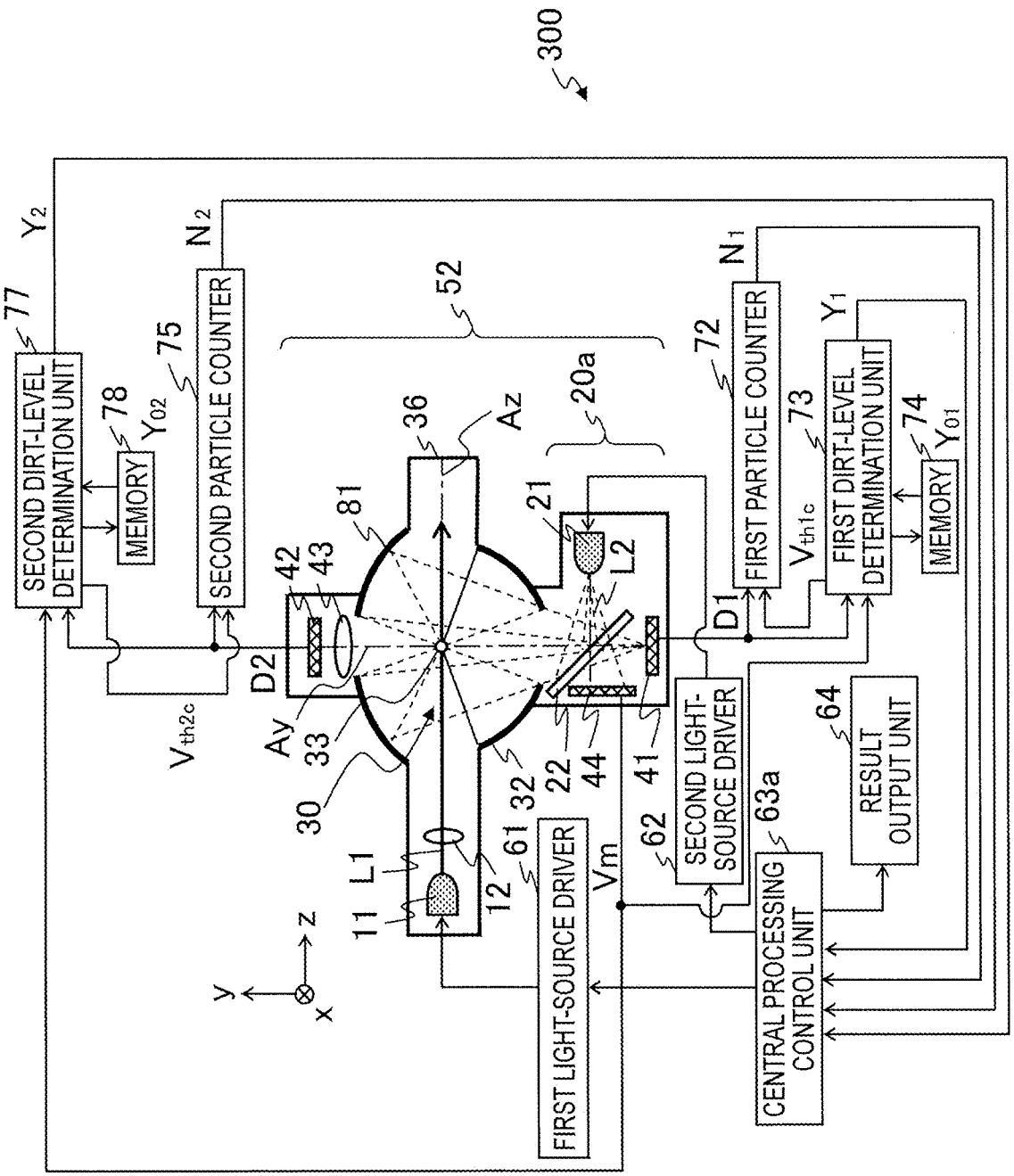
FIG. 13 is a diagram schematically showing a configuration of an optical system and a configuration of a control system of a particle detection device according to a third embodiment of the present invention.

FIG. 13 is a diagram schematically showing a configuration of an optical system 52 and a configuration of a control system of a particle detection device 300 according to a third embodiment. FIG. 13 shows a structure of the optical system 52 in a cross section obtained by cutting it by a plane parallel to a yz plane. FIG. 13 also shows components of the control system as functional blocks. In FIG. 13, components identical to or corresponding to the components shown in FIG. 8 or FIG. 12 are assigned the same reference numerals as the reference numerals shown in FIG. 8 or FIG. 12. The structure of the optical system 52 and an air flow path of the particle detection device 300 in a cross section obtained by cutting them by a plane parallel to a zx plane is similar to that in FIG. 2.

As shown in FIG. 13, the particle detection device 300 according to the third embodiment includes a third light-reception element 44 for detecting the second irradiation light L2 emitted from the second light source 21; and a third detection signal D3 outputted from the third light-reception element 44 is supplied to both the first dirt-level determination unit 73 and the second dirt-level determination unit 77. In this regard, the particle detection device 300 differs from the particle detection device 201 shown in FIG. 12.

The third light-reception element 44 is a light-amount-monitoring-use photodetector for monitoring change in the light amount of the second irradiation light L2 emitted from the second light source 21. For example, as shown in FIG. 13, the third light-reception element 44 detects part of the second irradiation light L2 that has passed through the beam splitter 22.

The third detection signal D3 indicating a monitor value Vm corresponding to the light amount of the second irradiation light L2 detected by the third light-reception element 44 is supplied to both the first dirt-level determination unit 73 and the second dirt-level determination unit 77. The monitor value Vm is a current value or a voltage value, for example.

The monitor value Vm can be used for correcting a variation error in a first dirt level value $Y_1$ obtained by the first dirt-level determination unit 73 and a variation error in a second dirt level value $Y_2$ obtained by the second dirt-level determination unit 77 caused by change in the light amount of the second irradiation light L2 from the second light source 21. In other words, it is possible to use a value obtained by normalizing, by using the monitor value Vm, the signal level of a first detection signal D1 obtained when the second irradiation light L2 reflected by the first light-collection mirror 81 or the second light-collection mirror 32 is received by the light-reception surface of the first light-reception element 41. Therefore, variation errors in the first dirt level value $Y_1$ and the second dirt level value $Y_2$ caused by change in the light amount of the second irradiation light L2 from the second light source 21 can be corrected and a more accurate dirt level value can be obtained.

As described above, the particle detection device 300 according to the third embodiment can correct variation errors in the first dirt level value $Y_1$ and the second dirt level value $Y_2$ caused by change in the light amount of the second irradiation light L2 emitted from the second light source 21, and therefore a more accurate dirt level value can be obtained.

The third light-reception element 44 for monitoring the light amount of the second irradiation light L2 is disposed so as to receive light that has passed through the beam splitter 22 and indirectly monitor the light amount of the second irradiation light L2. However, by using an optical-path changing member including another light-collection member, a spectroscopic element or the like, it may be configured to guide part of the second irradiation light L2 to the third light-reception element 44.

Except for the above, the third embodiment is the same as the second embodiment.

Further, the third light-reception element 44 can be applied to the particle detection devices according to the first and second embodiments.

Furthermore, instead of the beam splitter 22, a diffraction element for splitting light into propagation directions different in angles may be used. It can be configured that a beam of a certain diffraction order from the diffraction element is received by the third light-reception element 44 and at least a beam of any one of the other diffraction orders is used for detecting dirt on the first light-collection mirror 81 and the second light-collection mirror 32.

(4) Modification Example

Figure 14:
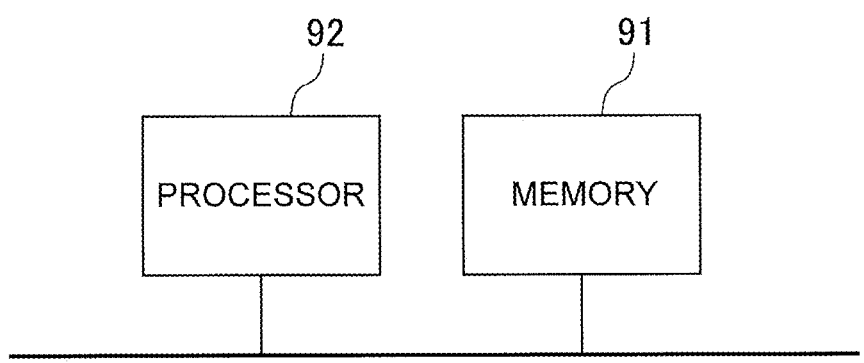
FIG. 14 is a hardware diagram schematically showing a configuration of a control system of a particle detection device according to a modification example of the first to third embodiments of the present invention.

FIG. 14 is a hardware configuration diagram schematically showing a configuration of a control system of the particle detection devices according to a modification example of the first to third embodiments. Although each of the control systems of the particle detection devices 100, 101, 200, 201 and 300 shown in FIG. 1, FIG. 3, FIG. 8, FIG. 12 and FIG. 13 can be configured by an integrated circuit, it may be implemented by using a memory 91 as a storage device for storing a program as software and a processor 92 as an information processor for executing the program stored in the memory 91 (by means of a computer, for example). Alternatively, part of each of the control systems of the particle detection devices 100, 101, 200, 201 and 300 may be implemented by the memory 91 and the processor 92 executing the program that are shown in FIG. 14.

In the present application, the scope indicated by terms indicating a position of a component, a positional relationship between parts or a shape of a component, such as 'parallel', 'perpendicular' or 'center' is a scope involving manufacturing tolerances, assembly variations and the like. Thus, in the present application, even if the terms such as 'parallel', 'perpendicular' or 'center' are used without statement of 'substantially', the scope indicated by these terms means a scope involving manufacturing tolerances, assembly variations and the like.

The components of the particle detection devices according to the above embodiments can be combined with each other if necessary.

EXPLANATION OF REFERENCE CHARACTERS 11 first light source; 12 lens; 20, 20a dirt-detection optical system; 21 second light source; 22 beam splitter (optical-path changing member); 22a reflection surface of beam splitter; 30 target space; 31 first light-collection mirror (first light-collection member); 32 second light-collection mirror (second light-collection member); 32a opening (light-passage region); 33 detection position; 34 air inlet; 35 air outlet; 36 beam trap; 41 first light-reception element; 42 second light-reception element; 43 lens; 44 third light-reception element; 50, 51, 52 optical system; 61 first light-source driver; 62 second light-source driver; 63, 63a central processing controller; 64 result output unit; 65 air-flow generator; 71 particle counter (first particle counter); 72 memory; 73 dirt-level determination unit (first dirt-level determination unit); 74 memory; 75 particle counter (second particle counter); 76 memory; 77 dirt-level determination unit (second dirt-level determination unit); 78 memory; 81 first light-collection mirror (first light-collection member); 81a opening (light-passage region); 100, 101, 200, 201, 300 particle detection device; L1 first irradiation light; L2 second irradiation light, L11 to L16, L11a to L16a light ray that reaches first light-reception element; L21 to L24, L21a, L22a second irradiation light that reaches first light-reception element; L25 second irradiation light that does not reach first light-reception element; L23a, L24a second irradiation light that reaches second light-reception element.

What is claimed is:

1. A particle detection device for detecting a particle floating in a target space, the particle detection device comprising:
    a first light source to emit first irradiation light traveling in the target space;
    a first light-collection member having a concave-shaped first reflection surface;
    a second light-collection member having a concave-shaped second reflection surface facing the first reflection surface across the target space;
    a second light source to emit second irradiation light;
    a first light-reception element including a photodetector and configured to output a first detection signal indicating a value corresponding to intensity of first incident light;
    a beam splitter arranged between the target space and the second light source; and
    a controller circuit configured to detect, as a particle detection signal, the first detection signal when the first light source emits the first irradiation light;
    the controller circuit further configured to detect, as a dirt detection signal, the first detection signal when the second light source emits the second irradiation light; and
    the controller circuit is further configured to determine a corrected particle detection value based on the particle detection signal and the dirt detection signal,
    wherein when the first light source emits the first irradiation light, the first light-reception element detects, as the first incident light, scattered light generated when a particle existing in a predetermined detection position in the target space is irradiated with the first irradiation light, thereby outputting a first signal regarding the particle,
    when the second light source emits the second irradiation light, the first light-reception element detects, as the first incident light, reflected light including both of a light ray of the second irradiation light that is reflected at the first reflection surface and a light ray of the second irradiation light that is reflected at both the first reflection surface and the second reflection surface, thereby outputting a second signal indicating a degree of dirt adhered to the first light-collection member and the second light collection member,
    wherein the first light source is configured to emit the first irradiation light into the target space without first passing through the beam splitter, and the second light source is configured to emit the second irradiation light into the target space via the beam splitter, and
    wherein the dirt detection signal indicates an amount of dirt on the first light-collection member and the second light-collection member or a level of deterioration in optical characteristics of the first light-collection member and the second light-collection member.

2. The particle detection device according to claim 1, wherein the first reflection surface of the first light-collection member is an ellipsoid-shaped surface having a first focal point located in the target space and a second focal point located outside the target space.

3. The particle detection device according to claim 2, wherein the second reflection surface of the second light-collection member is a spherical-shaped surface having the first focal point as a center point.

4. The particle detection device according to claim 2, wherein the detection position is a position of the first focal point.

5. The particle detection device according to claim 1, wherein when the first light source emits the first irradiation light, the first light-reception element detects, as the first incident light, a light ray of the scattered light traveling along a first path that is reflected by the first reflection surface and then reaches the first light-reception element, a light ray of the scattered light traveling along a second path that is reflected by the second reflection surface, is then reflected by the first reflection surface and then reaches the first light-reception element, and a light ray of the scattered light traveling along a third path that directly reaches the first light-reception element,
    when the second light source emits the second irradiation light, the first light-reception element detects, as the first incident light, a light ray of the second irradiation light traveling along a fourth path that is reflected by the first reflection surface and a light ray of the second irradiation light traveling along a fifth path that is reflected by both the first reflection surface and the second reflection surface.

6. The particle detection device according to claim 1, further comprising an optical-path changing member including an optical element configured to change a path of incident light;
    wherein part of the second irradiation light emitted from the second light source travels toward the first reflection surface via the optical-path changing member,
    part of light traveling from the target space toward the optical-path changing member travels toward the first light-reception element via the optical-path changing member.

7. The particle detection device according to claim 6, wherein the optical-path changing member includes a beam splitter.

8. The particle detection device according to claim 1, wherein the first light-reception element and the second light source are arranged at positions to be optically conjugate to each other.

9. The particle detection device according to claim 1, further comprising a controller circuit to determine density of the particles, based on the first detection signal outputted from the first light-reception element, when the first light source emits the first irradiation light.

10. The particle detection device according to claim 9, wherein the controller circuit changes intensity of the first irradiation light outputted from the first light source, based on the first detection signal outputted from the first light-reception element, when the second light source emits the second irradiation light.

11. The particle detection device according to claim 9, further comprising a third light-reception element to receive part of the second irradiation light emitted from the second light source as third incident light and to output a third detection signal indicating a value corresponding to intensity of the third incident light,
wherein the controller circuit corrects density of the particles by using the third detection signal.

12. The particle detection device according to claim 1, further comprising a second light-reception element to output a second detection signal indicating a value corresponding to intensity of second incident light,
wherein the first light-collection member includes a light-passage region that allows the second incident light traveling from the target space to the second light-reception element to pass through.

13. The particle detection device according to claim 12, wherein when the first light source emits the first irradiation light, the second light-reception element detects, as the second incident light, a light ray of scattered light generated when a particle existing in the detection position is irradiated with the first irradiation light that has passed through the light-passage region.

14. The particle detection device according to claim 12, wherein when the second light source emits the second irradiation light, the second light-reception element detects, as the second incident light, a light ray of the second irradiation light that has passed through the light-passage region.

15. The particle detection device according to claim 12, further comprising a controller circuit to determine any one or more of number, weight, type and density of the particles, based on the first detection signal outputted from the first light-reception element and the second detection signal outputted from the second light-reception element, when the first light source emits the first irradiation light.

16. The particle detection device according to claim 15, wherein the controller circuit changes intensity of the first irradiation light emitted from the first light source, based on the first detection signal outputted from the first light-reception element and the second detection signal outputted from the second light-reception element, when the second light source emits the second irradiation light.

17. The particle detection device according to claim 15, further comprising a third light-reception element to receive part of the second irradiation light emitted from the second light source as third incident light and to output a third detection signal indicating a value corresponding to intensity of the third incident light,
wherein the controller circuit corrects one or more of number, weight, type and density of the particles by using the third detection signal.

\* \* \* \* \*